(12) United States Patent
Schmidtchen et al.

(10) Patent No.: US 12,585,330 B2
(45) Date of Patent: *Mar. 24, 2026

(54) EYE TRACKING BASED SELECTION OF A USER INTERFACE (UI) ELEMENT BASED ON TARGETING CRITERIA

(71) Applicant: Apple Inc., Cupertino, CA (US)

(72) Inventors: Bryce L. Schmidtchen, San Francisco, CA (US); Ioana Negoita, San Jose, CA (US); Anshu K. Chimalamarri, Sunnyvale, CA (US); Gregory Lutter, Boulder Creek, CA (US); Thomas J. Moore, Cupertino, CA (US); Trevor J. McIntyre, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,151

(22) Filed: Apr. 30, 2024

(65) Prior Publication Data

US 2024/0302898 A1      Sep. 12, 2024

Related U.S. Application Data

(63) Continuation of application No. 18/117,997, filed on Mar. 6, 2023, now Pat. No. 12,008,160.

(Continued)

(51) Int. Cl.
*G06F 3/01* (2006.01)
*G06F 3/0482* (2013.01)
(Continued)

(52) U.S. Cl.
CPC ............ *G06F 3/013* (2013.01); *G06F 3/0482* (2013.01); *G06T 7/55* (2017.01); *G06T 7/60* (2013.01);
(Continued)

(58) Field of Classification Search
CPC ....................................................... G06F 3/013
(Continued)

(56) References Cited

U.S. PATENT DOCUMENTS 9,400,553 B2      7/2016   Kerr et al.
10,025,378 B2     7/2018   Venable et al.
(Continued)

FOREIGN PATENT DOCUMENTS

CN        109324686 A       2/2019
WO        2015168343 A1    11/2015
(Continued)

OTHER PUBLICATIONS

Extended European Search Report for corresponding European Appl. No. 23164891.6 dated Jul. 28, 2023.

*Primary Examiner* — Long D Pham
(74) *Attorney, Agent, or Firm* — Fernando & Partners, LLP

(57)        ABSTRACT

A method is performed at an electronic device with one or more processors, a non-transitory memory, and a display. The method includes displaying, on the display, a first user interface (UI) element that is associated with a first selection region and a second selection region. The method includes, while displaying the first UI element, determining, based on eye tracking data, that a targeting criterion is satisfied with respect to the first selection region or the second selection region. The eye tracking data is associated with one or more eyes of a user of the electronic device. The method includes, while displaying the first UI element, selecting the first UI element based at least in part on determining that the targeting criterion is satisfied.

24 Claims, 27 Drawing Sheets

Related U.S. Application Data

(60) Provisional application No. 63/325,545, filed on Mar. 30, 2022.

(51) Int. Cl.
| | |
|---|---|
| *G06T 7/55* | (2017.01) |
| *G06T 7/60* | (2017.01) |
| *G06T 7/73* | (2017.01) |

(52) U.S. Cl.
CPC ............ *G06T 7/73* (2017.01); *G06T 2200/24* (2013.01); *G06T 2207/30201* (2013.01)

(58) Field of Classification Search
USPC ........................................................ 345/156
See application file for complete search history.

(56) References Cited

U.S. PATENT DOCUMENTS

| | | | |
|---|---|---|---|
| 10,268,266 | B2 | 4/2019 | Mathey-Owens et al. |
| 10,684,485 | B2 | 6/2020 | Stafford et al. |
| 11,073,904 | B2 | 7/2021 | Raghunath et al. |
| 2014/0372957 | A1 | 12/2014 | Keane et al. |
| 2015/0212576 | A1 | 7/2015 | Ambrus et al. |
| 2016/0012631 | A1 | 1/2016 | Kim et al. |
| 2016/0162020 | A1* | 6/2016 | Lehman ................. G06F 3/017 |
| | | | 715/835 |
| 2017/0038837 | A1* | 2/2017 | Faaborg ................. G06F 3/017 |
| 2017/0287225 | A1 | 10/2017 | Powderly et al. |
| 2017/0293402 | A1 | 10/2017 | Morris et al. |
| 2019/0250733 | A1 | 8/2019 | Pelis et al. |
| 2020/0081524 | A1 | 3/2020 | Schmidt et al. |
| 2020/0201514 | A1 | 6/2020 | Murphy et al. |
| 2020/0249750 | A1 | 8/2020 | Choi et al. |
| 2021/0103340 | A1 | 4/2021 | Bradski et al. |

FOREIGN PATENT DOCUMENTS

| | | |
|---|---|---|
| WO | 2016089638 A1 | 6/2016 |
| WO | 2018226621 A1 | 12/2018 |
| WO | 2021092194 A1 | 5/2021 |

* cited by examiner

400

500

EYE TRACKING BASED SELECTION OF A USER INTERFACE (UI) ELEMENT BASED ON TARGETING CRITERIA

CROSS-REFERENCE TO RELATED APPLICATIONS

This application is a continuation of U.S. Nonprovisional patent application Ser. No. 18/117,997, filed on Mar. 6, 2023, which claims priority to U.S. Provisional Patent App. No. 63/325,545, filed on Mar. 30, 2022, both of which are hereby incorporated by reference in their entireties.

TECHNICAL FIELD

The present disclosure relates to displaying content on a display and, in particular, to selecting content based on eye tracking.

BACKGROUND

In various circumstances, a device displays one or more user interface (UI) elements, each of which is selectable. For example, certain techniques include the device assessing a user input in order to facilitate selection of a particular UI element. However, in some circumstances, a user inadvertently selects a UI element (e.g., a false positive selection). The problem of inadvertent selection is exacerbated when the device displays multiple UI elements that are proximate to each other.

SUMMARY

In accordance with some implementations, a method is performed at an electronic device with one or more processors, a non-transitory memory, an eye tracker, and a display. The eye tracker receives eye tracking data associated with one or more eyes of a user of the electronic device. The method includes displaying, on the display, a first user interface (UI) element that is associated with a first selection region and a second selection region. While displaying the first UI element, the method includes determining, based on the eye tracking data, that a first targeting criterion is satisfied with respect to the first selection region, and determining, based on the eye tracking data, that a second targeting criterion is satisfied with respect to the second selection region. Moreover, the method includes selecting the first UI element based at least in part on determining the satisfaction of the first targeting criterion and the second targeting criterion.

In accordance with some implementations, an electronic device includes one or more processors, a non-transitory memory, an eye tracker, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
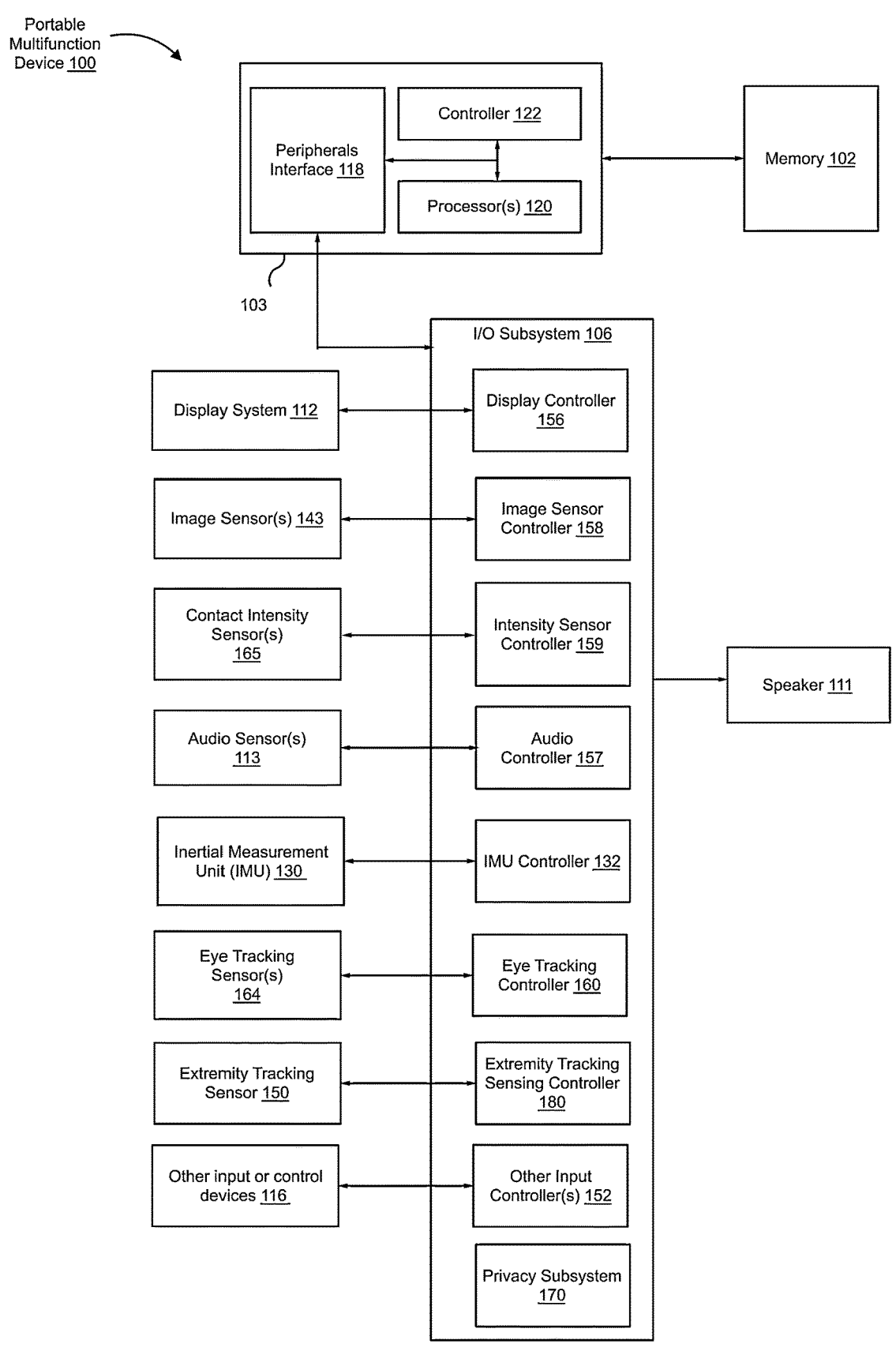
FIG. 1 is a block diagram of an example of a portable multifunction device in accordance with some implementations.

Certain techniques include assessing eye gaze of a user as an input for selection of a user interface (UI) element. For example, some techniques include selecting a UI element based on determining that the eye gaze is directed to the UI element. However, in some circumstances, a user inadvertently selects the UI element (e.g., a false positive selection) by unintentionally gazing at the UI element. The problem of inadvertent selection is exacerbated by the fact that eye tracking is often noisy and thus inaccurate. Inadvertent selection of a particular UI element is further exacerbated when multiple UI elements are displayed proximate to each other. For example, a user intentionally gazes at a first UI element in order to select the first UI element, but subsequent gaze drift results in an unintentional selection of a proximate, second UI element.

By contrast, various implementations disclosed herein include methods, electronic devices, and systems of eye tracking based selection of a UI element based on multiple targeting criteria. Namely, the UI element is associated with a first selection region associated with a first targeting criterion, and includes a second selection region associated with a second targeting criterion. Based at least in part on determining satisfaction of the first targeting criterion and the second targeting criterion, an electronic device selects the UI element. For example, the electronic device determines satisfaction of a targeting criterion in response to determining, based on eye tracking data, that a gaze position is directed to a corresponding selection region for at least a threshold amount of time. In some implementations, in response to determining satisfaction of the first targeting criterion, the electronic device prioritizes selection of (e.g., make selection easier) the second selection region. For example, the electronic device enlarges the second selection region in order to make satisfaction of the second targeting criterion easier. Accordingly, selection of the UI element is more accurate, as compared with other techniques. For example, selection of the UI element is associated with fewer false positives.

In some implementations, selecting the UI element is further based on determining that a gaze movement from the first selection region to the second selection region satisfies a scanning criterion. For example, the gaze movement satisfies the scanning criterion when the gaze movement is not too fast or too slow. As another example, the gaze movement satisfies the scanning criterion when the gaze movement stays within a scanning region, which is positioned within the boundary of the UI element.

In some implementations, an electronic device concurrently displays first and second UI elements. The first UI element is associated with the first and second selection regions. The second UI element is associated with a third selection region, which may partially overlap with the first selection region. In some implementations, the electronic device reduces the size of or deactivates the third selection region based on determining that the first targeting criterion with respect to the first selection region is satisfied. Reducing the size of the third selection region reduces overlap between the first and third selection regions, thereby reducing the likelihood of a false positive selection of the second UI element via a gaze directed to the third selection region.

Moreover, in some implementations, selection of the first UI element is sticky. As one example, the electronic device selects the first UI element based on determining respective gaze positions directed to the first and selection regions of the first UI element. Subsequently, the electronic device determines that the gaze position is directed to a second UI element, which is spatially distinct from the first UI element. For instance, the second UI element is proximate to the first UI element. Rather than selecting the second UI element, however, the electronic device sticks to selection of the first UI element. Accordingly, various implementations disclosed herein provide improved selection stability and consistency.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, paired input device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired input device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired input device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both cars) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
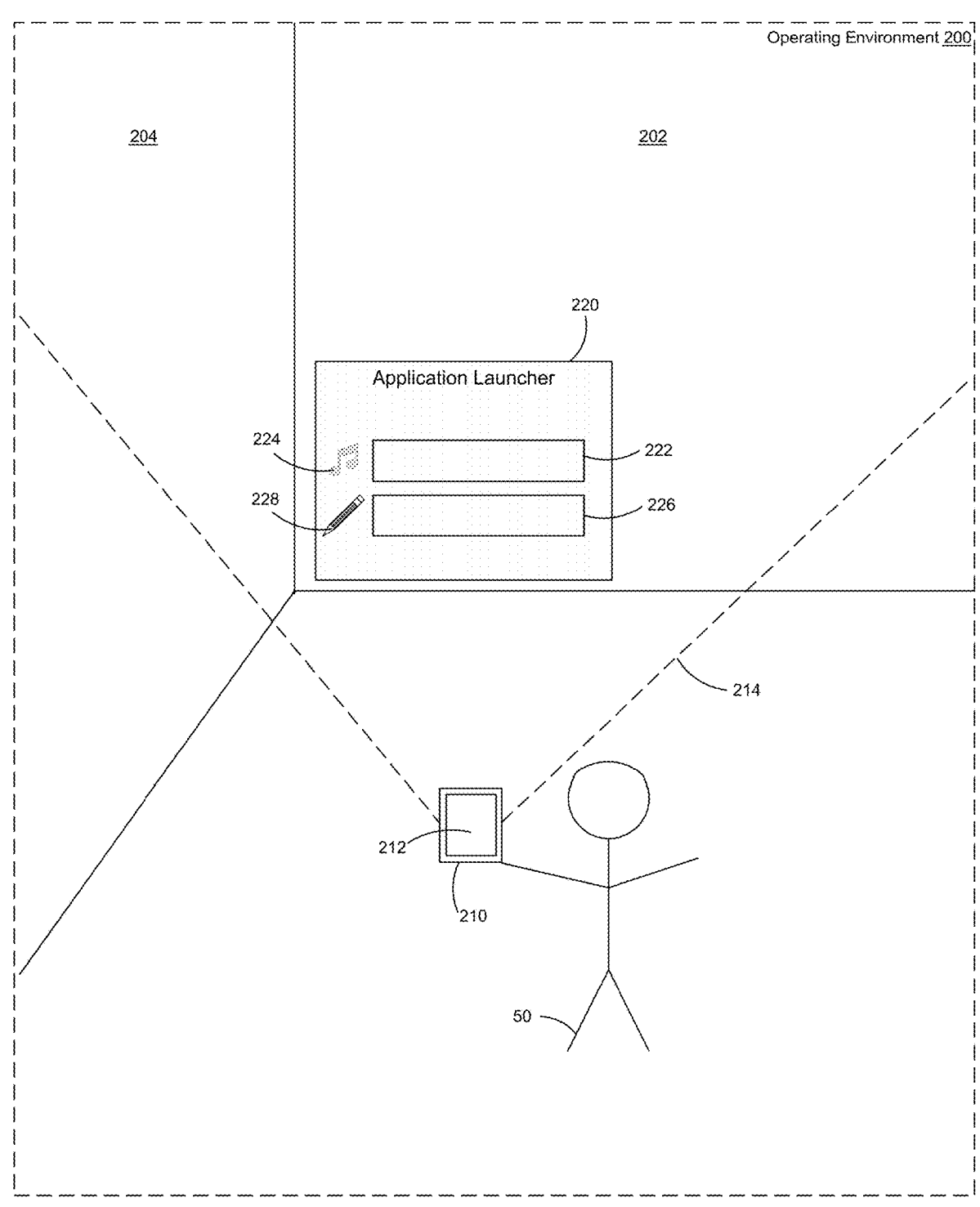
FIGS. 2A-2U are examples of eye tracking based selection of a UI element in accordance with some implementations.
Figure 2B:
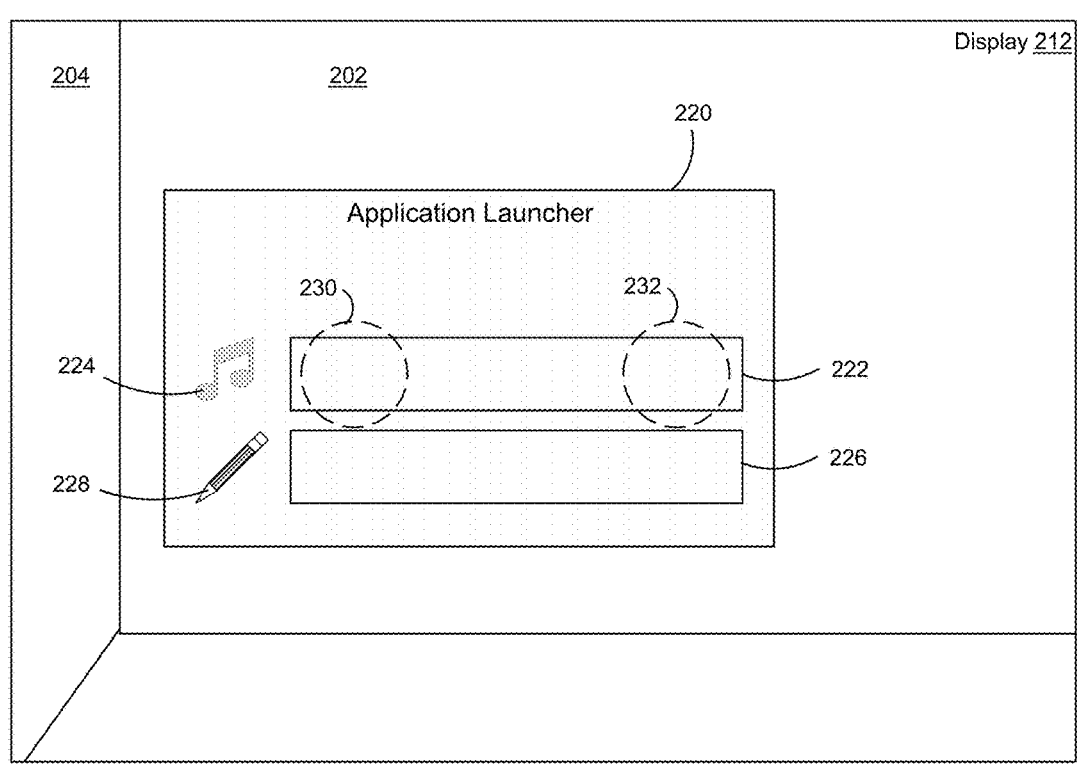
Figure 2C:
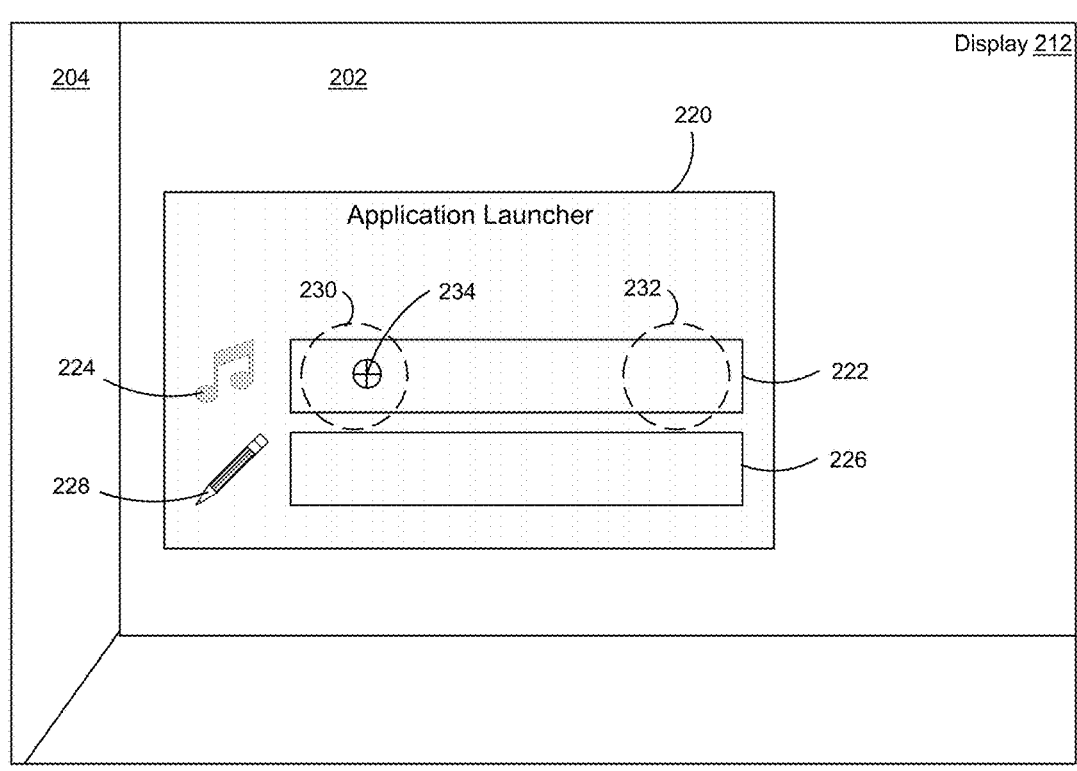
Figure 2D:
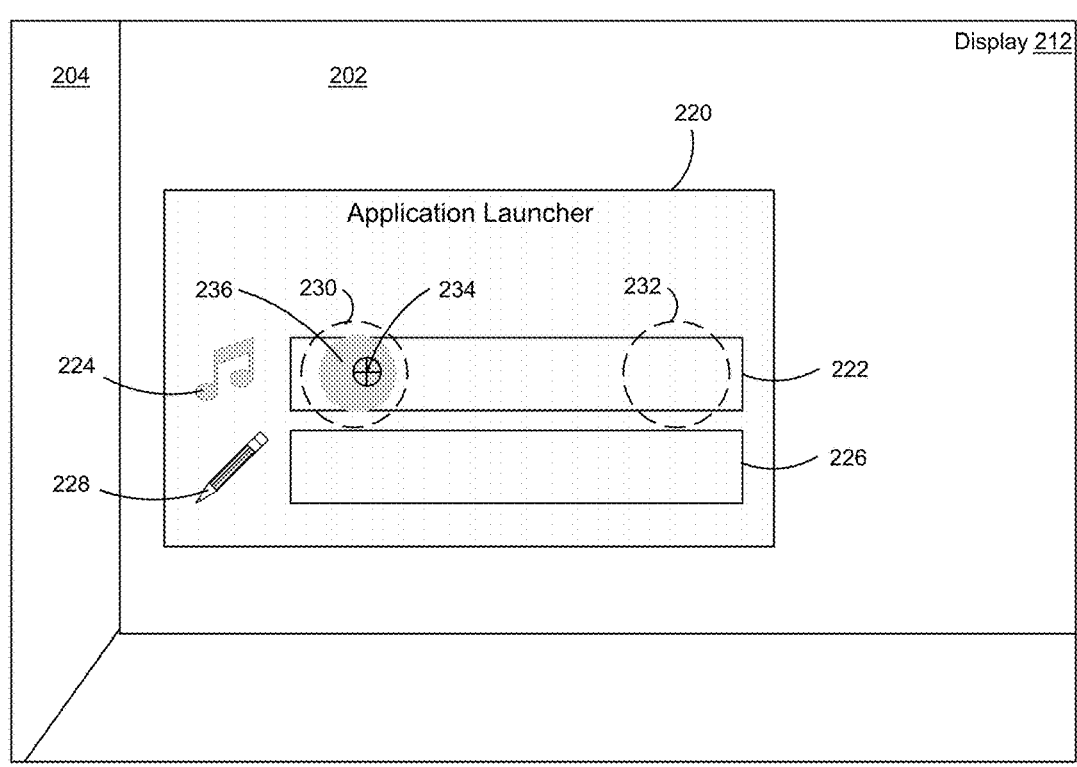
Figure 2E:
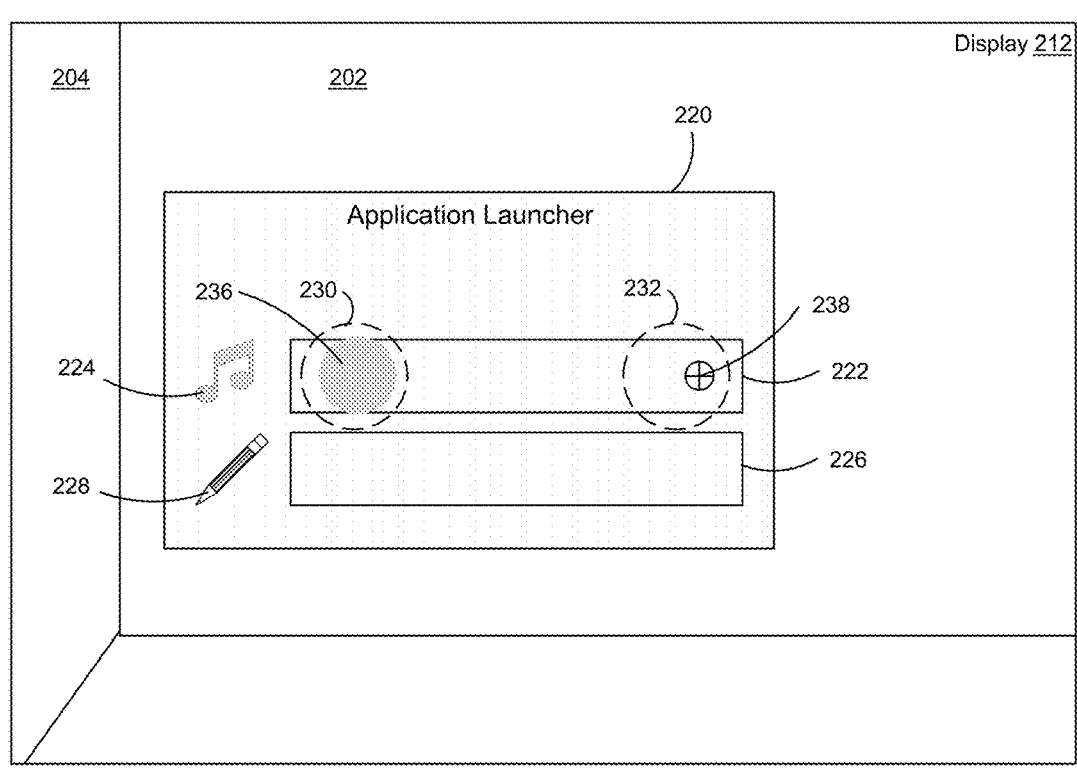
Figure 2F:
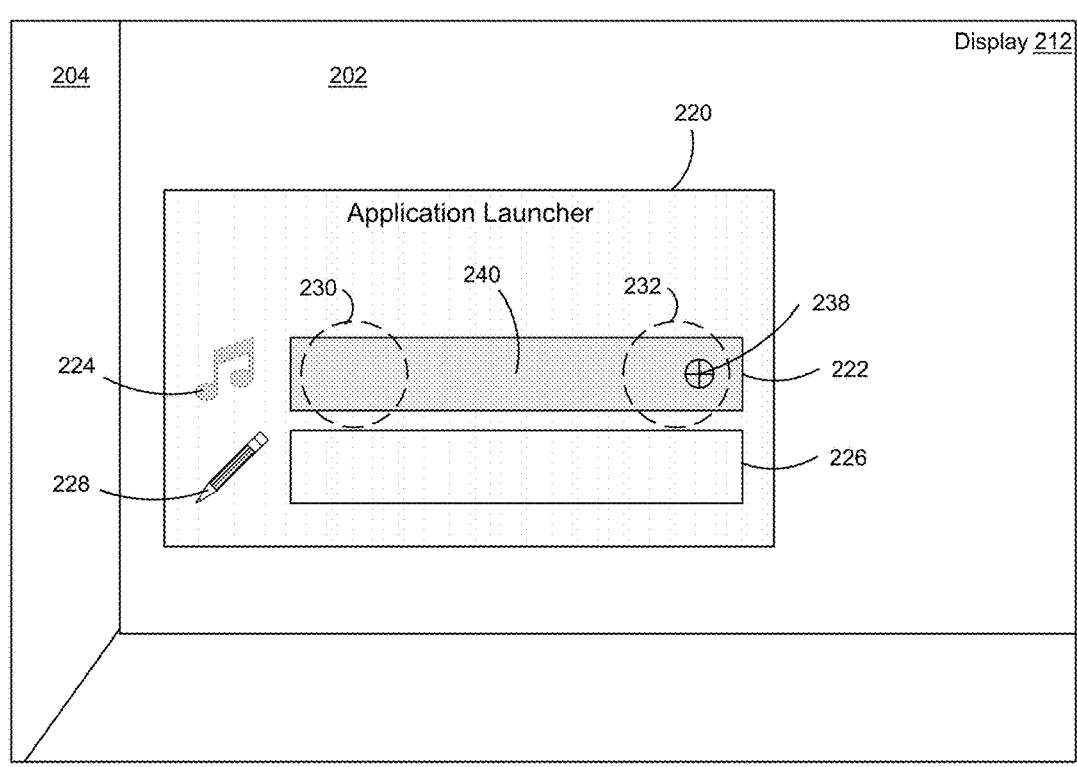
Figure 2G:
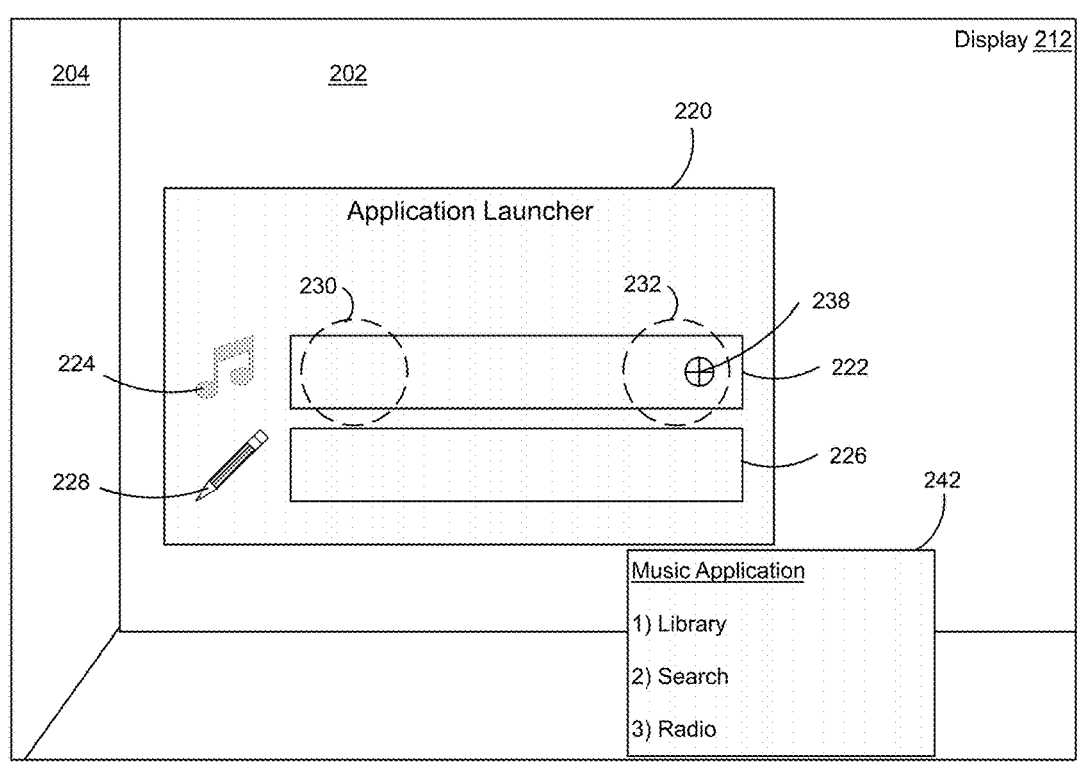
Figure 2H:
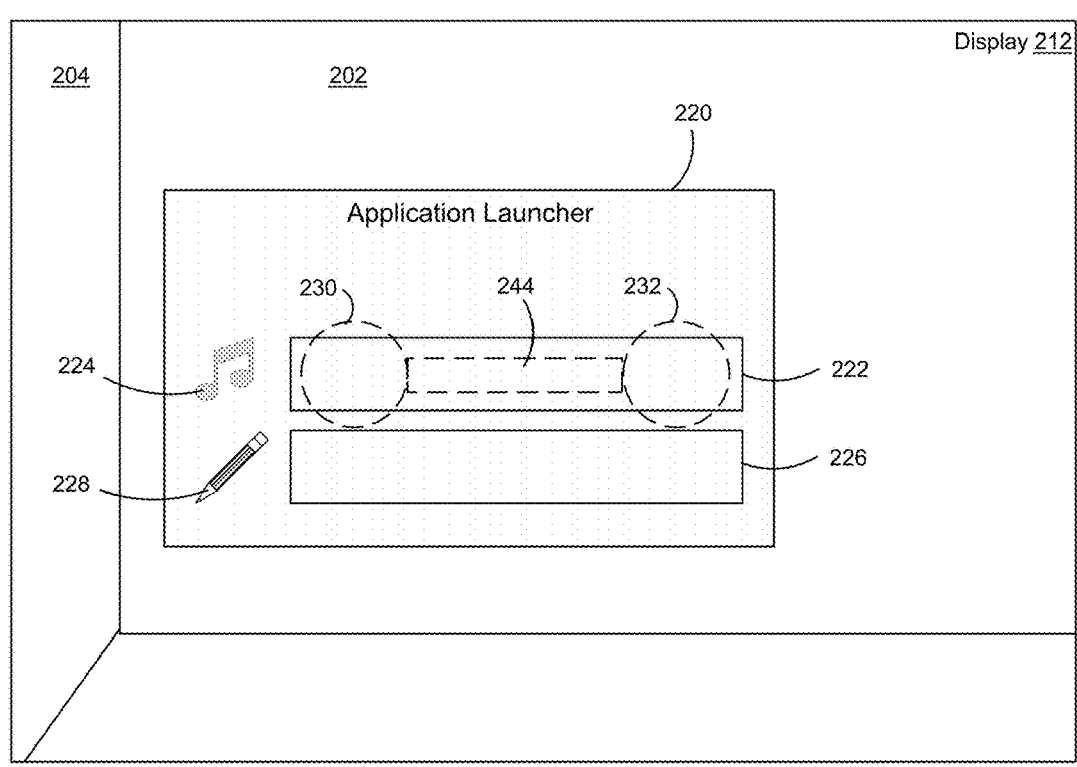
Figure 2I:
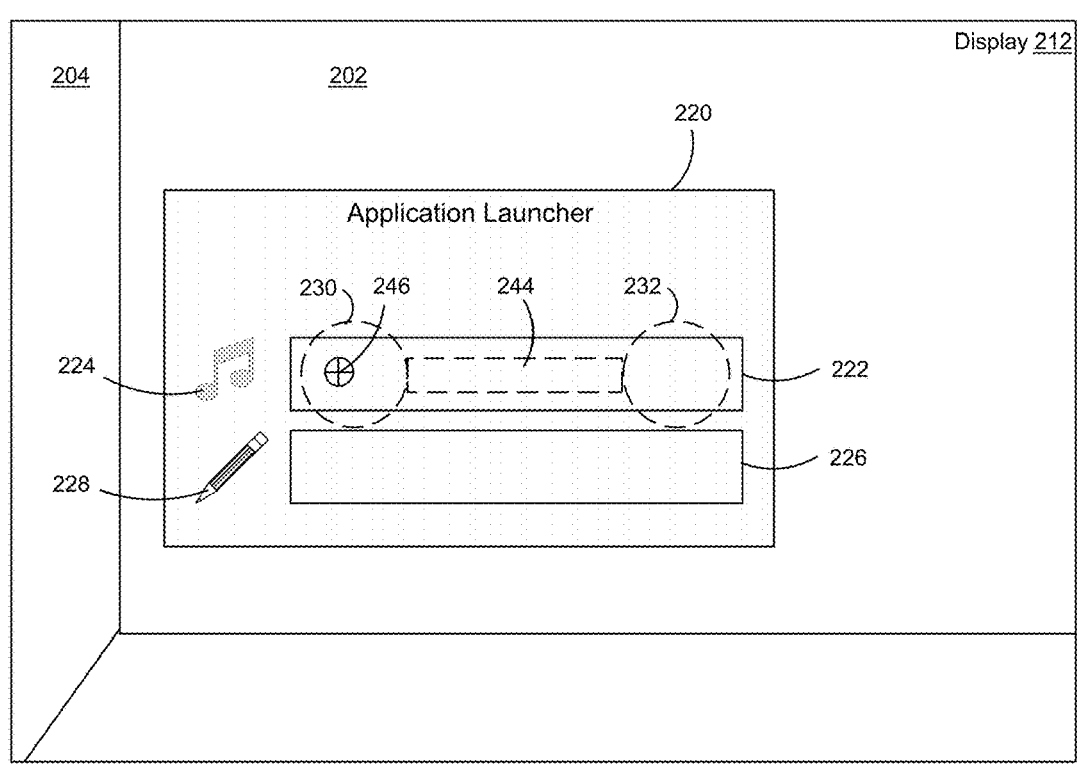
Figure 2J:
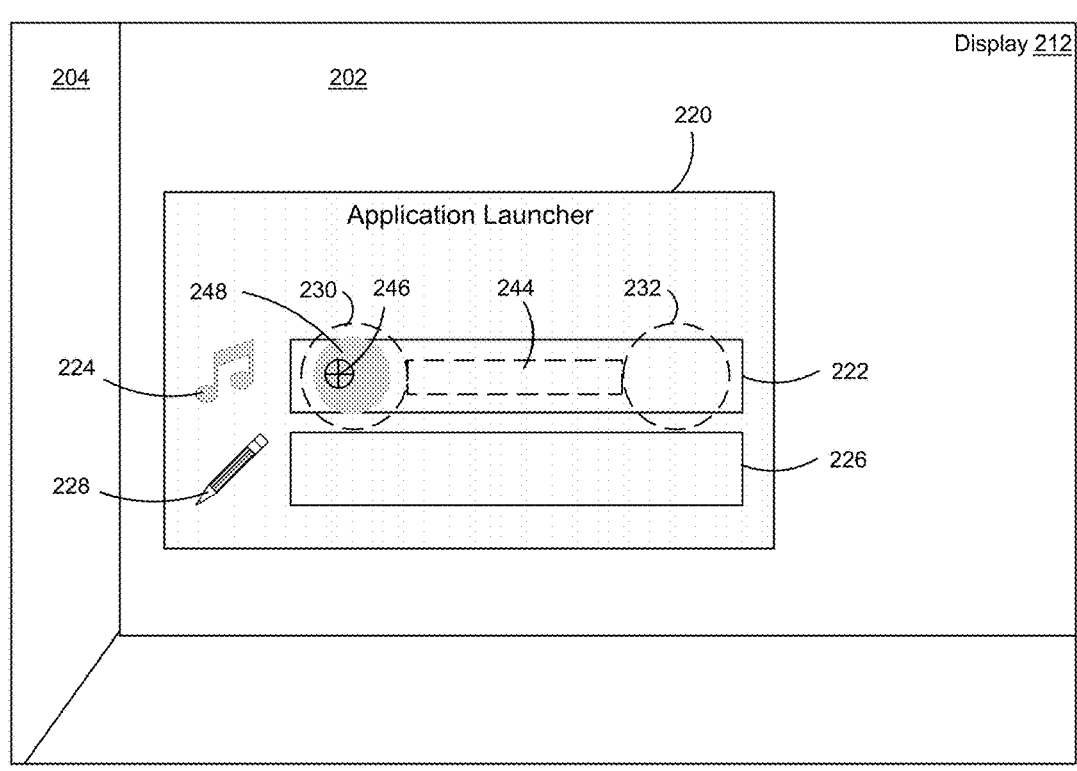
Figure 2K:
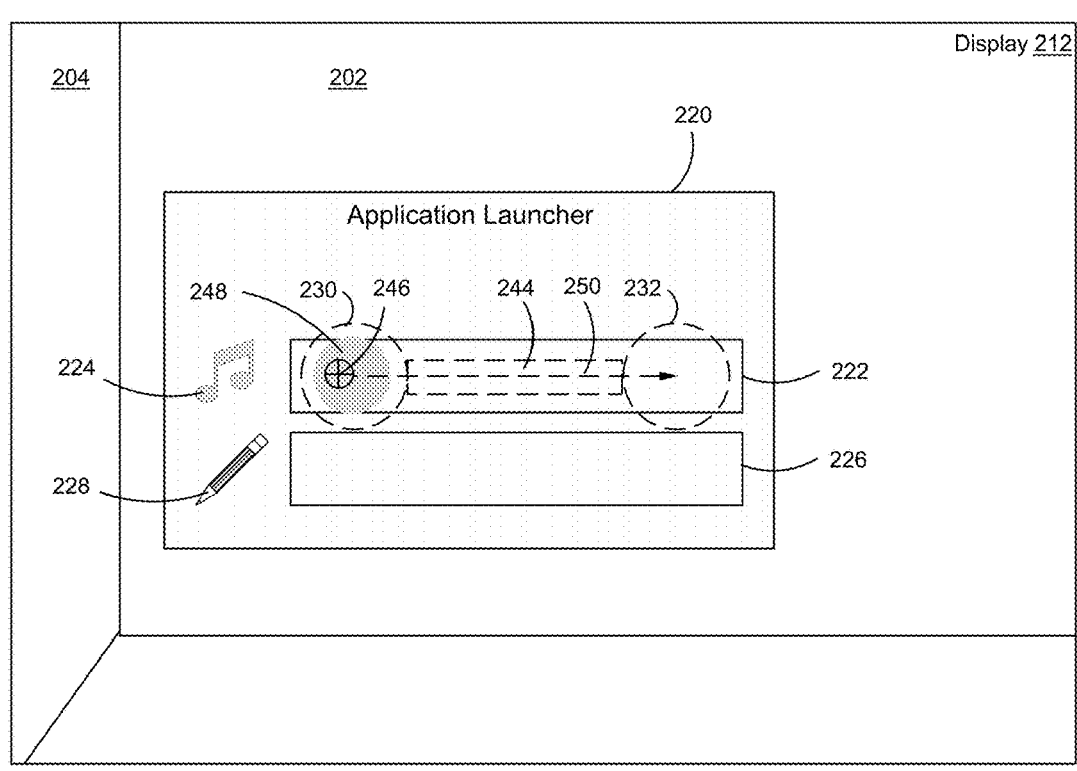
Figure 2L:
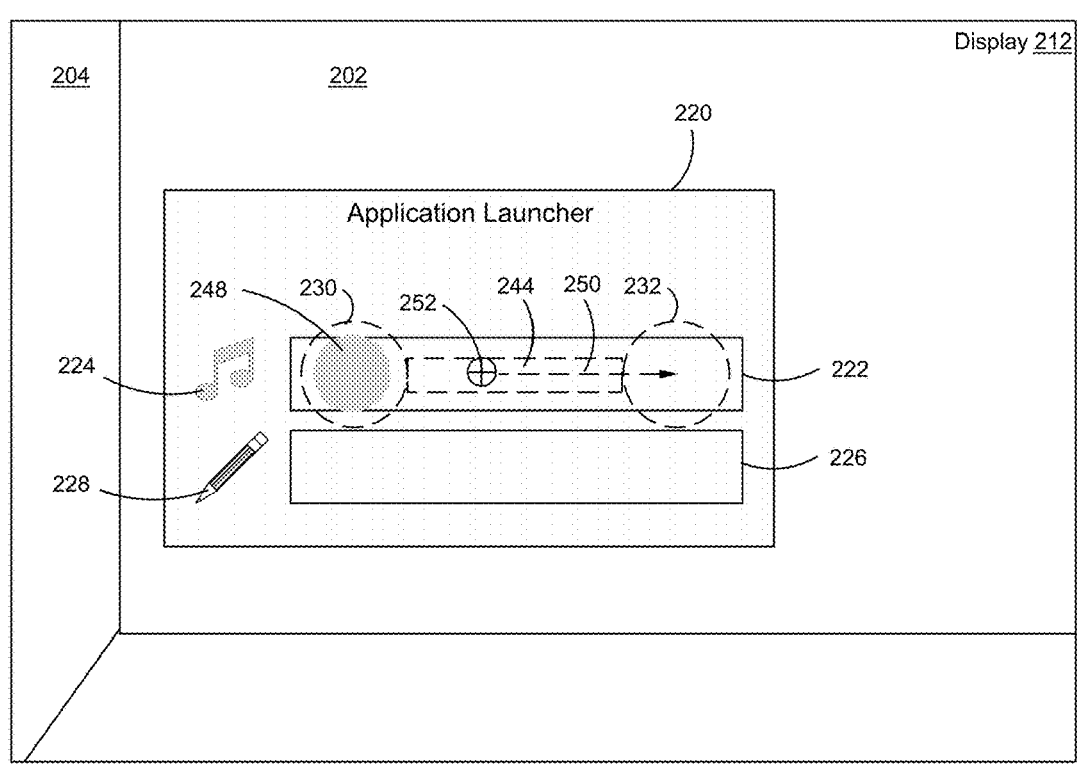
Figure 2M:
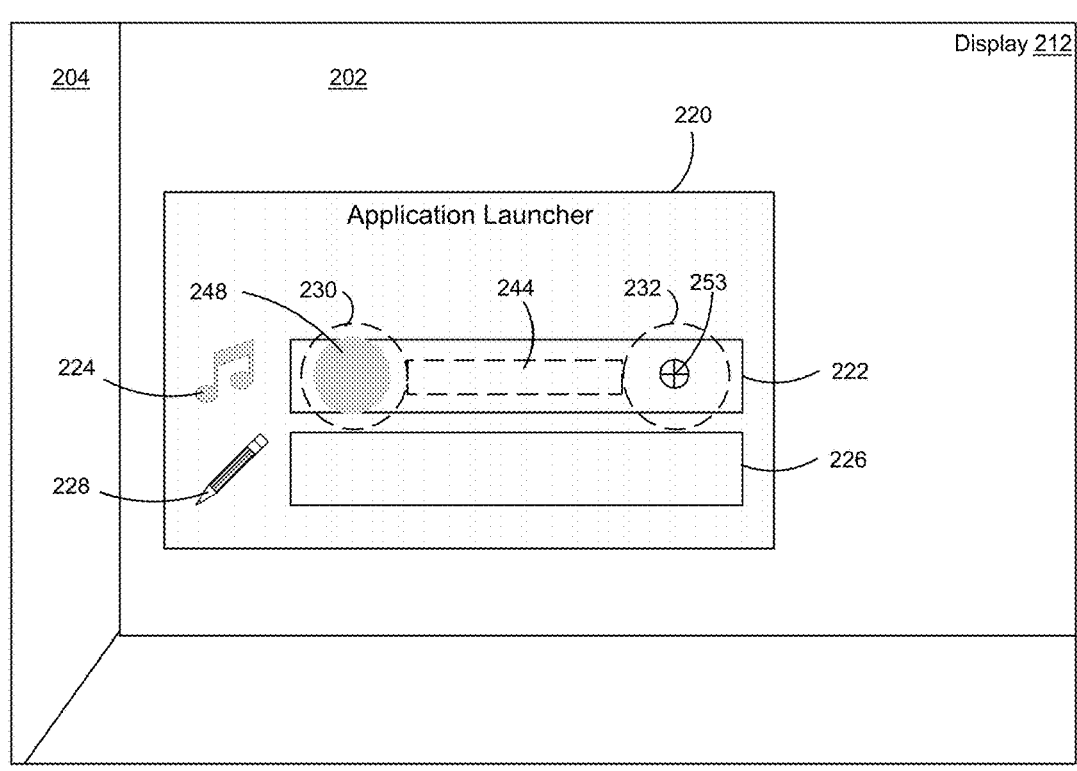
Figure 2N:
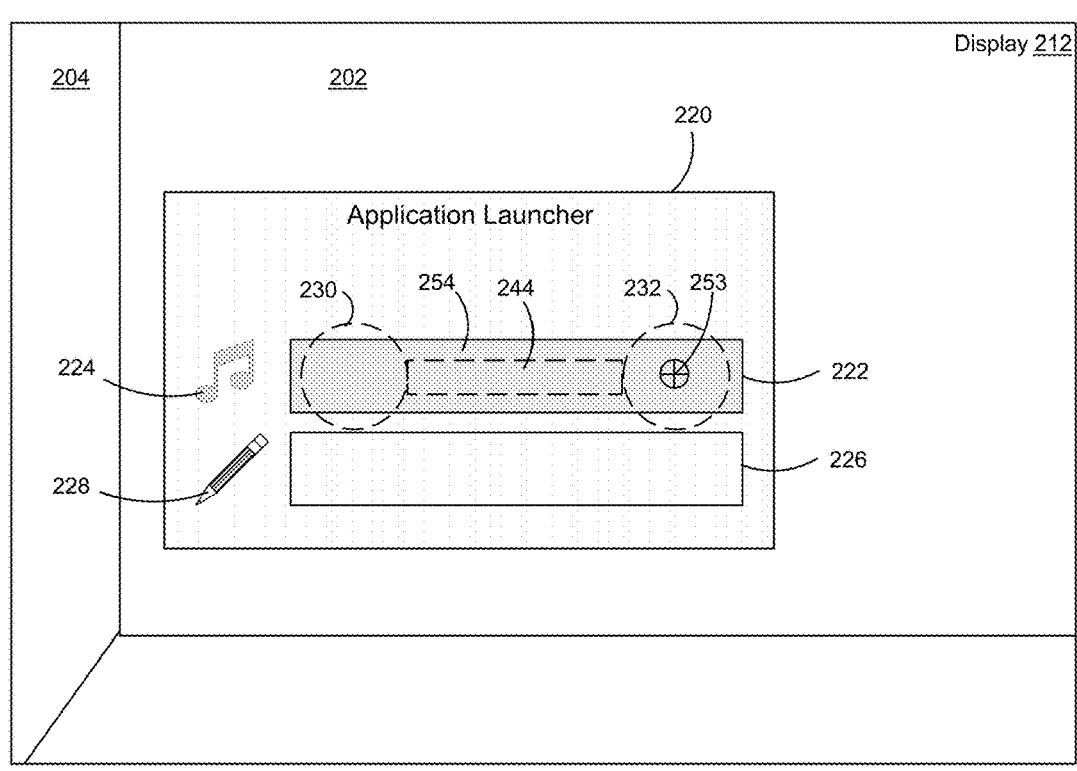
Figure 2O:
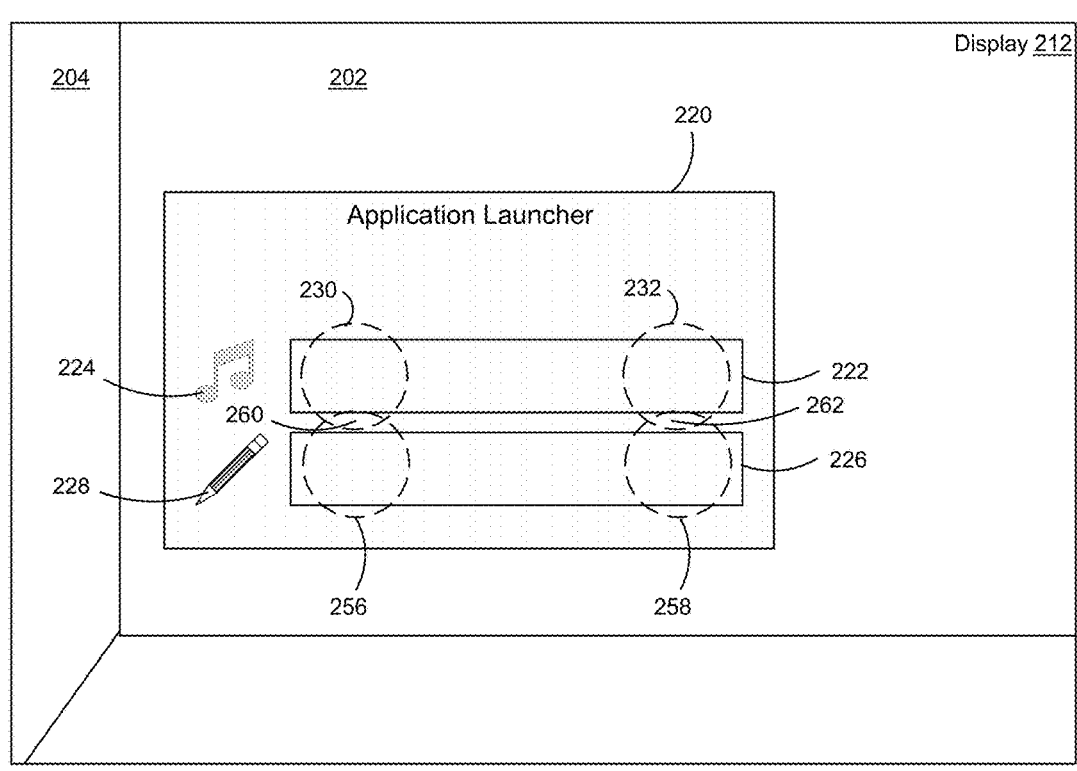
Figure 2P:
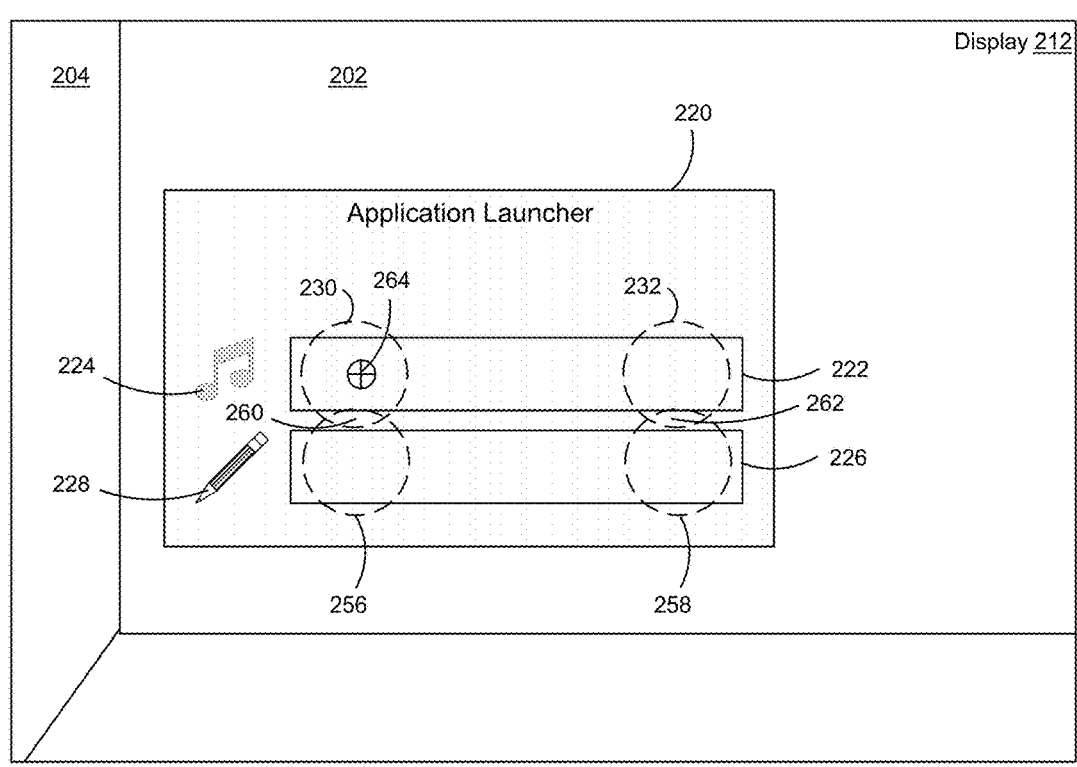
Figure 2Q:
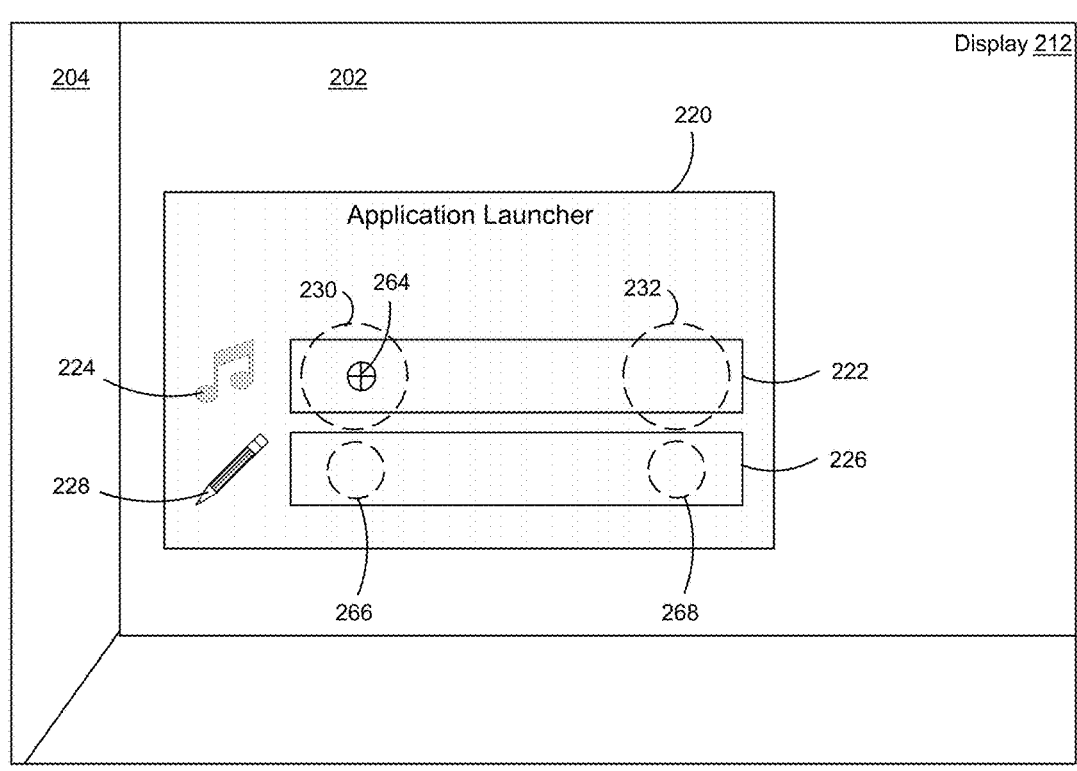
Figure 2R:
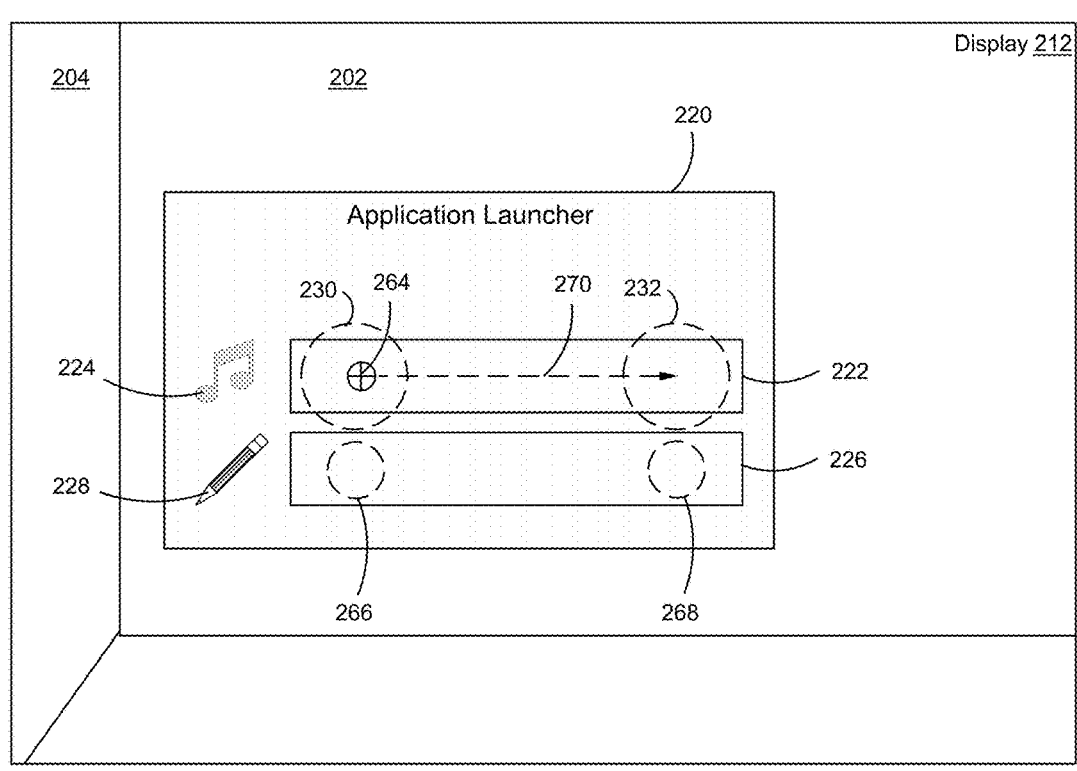
Figure 2S:
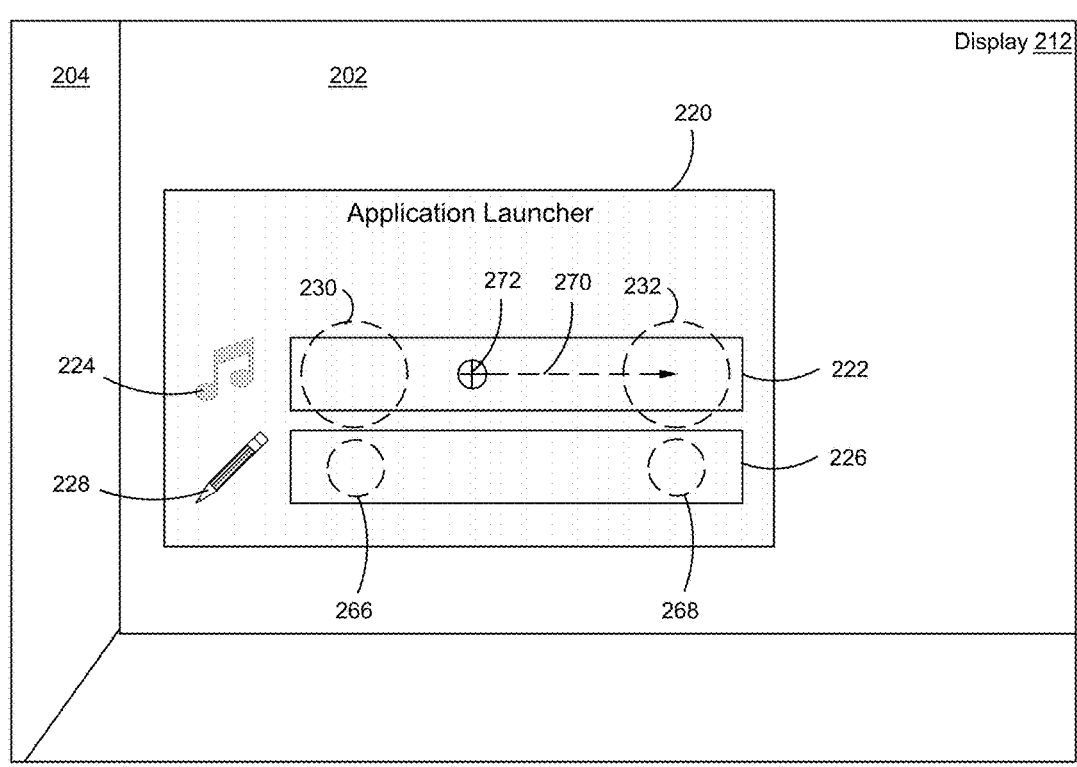
Figure 2T:
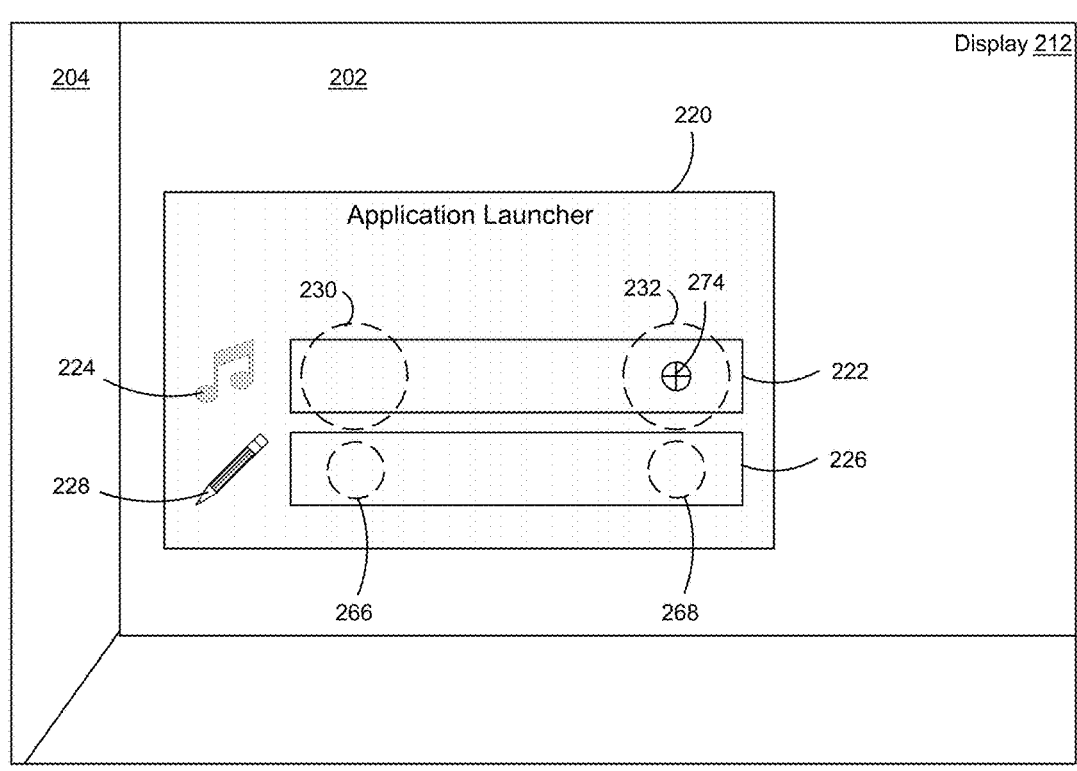
Figure 2U:
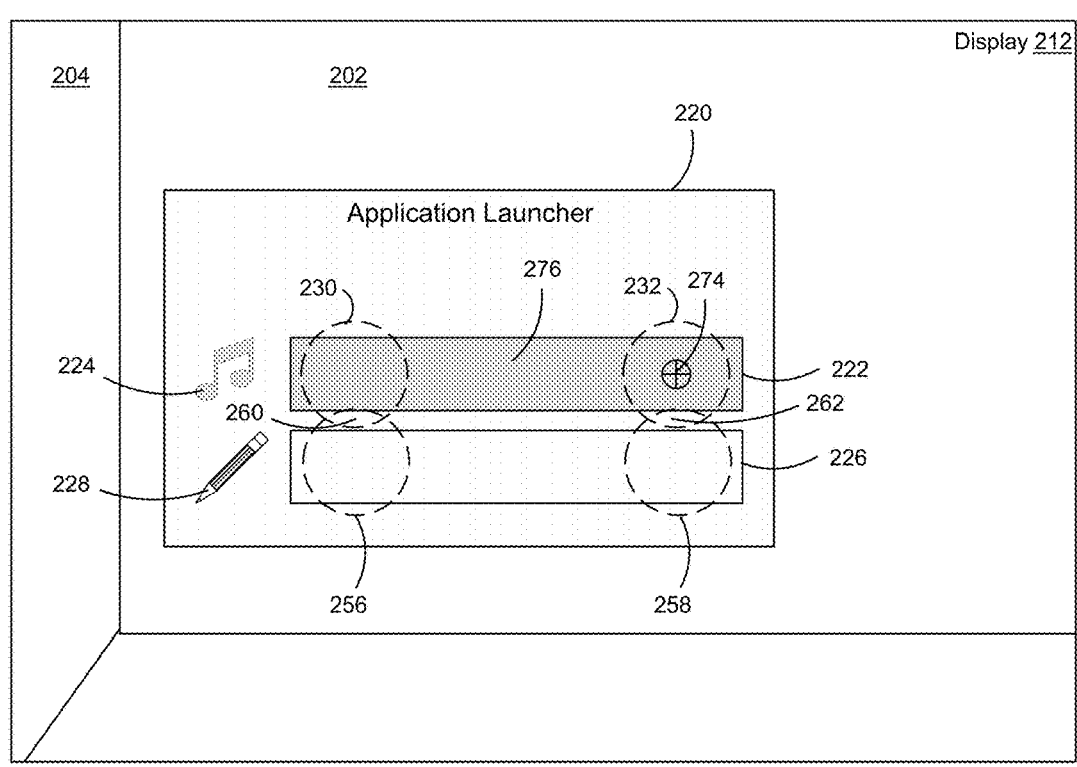

FIGS. 2A-2U are examples of eye tracking based selection of a UI element based on various criteria in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 2A, a user 50 holds electronic device 210 that operates according to an operating environment 200. The operating environment 200 includes a first wall 202 and a second wall 204. For example, the operating environment 200 corresponds to an XR environment previously described. The electronic device 210 includes an eye tracker (e.g., the eye tracking sensor 164 and the eye tracking controller 160 of FIG. 1) and a display 212. The display 212 is associated with a viewable region 214 of the operating environment 200. In some implementations, the electronic device 210 corresponds to a mobile device, such as a smartphone, tablet, etc.

In some implementations, the electronic device 210 corresponds to a head-mountable device (HMD) that includes a stereo pair of integrated displays (e.g., built-in displays) that display a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) a representation of the operating environment 200.

The electronic device 210 displays, on the display 212, an application launcher 220 that enables the launching of various applications. To that end, the application launcher 220 includes a first UI element 222 and a second UI element 226. The first UI element 222 enables launching of a music application, as indicated by a note graphic 224 that is proximate to the first UI element 222. The second UI element 226 enables launching of a drawing application, as indicated by a drawing graphic 228 that is proximate to the second UI element 226. One of ordinary skill in the art will appreciate that, in some implementations, the application launcher 220 includes more or fewer UI elements. One of ordinary skill in the art will further appreciate that, in some implementations, the electronic device 210 displays and selects (as will be described below) one or more UI elements without displaying additional content (e.g., without displaying the application launcher 220).

As illustrated in FIG. 2B, the display 212 includes the application launcher 220, as well as respective portions of the first wall 202 and the second wall 204. The first UI element 222 is associated with a first selection region 230 and a second selection region 232. The first selection region 230 and the second selection region 232 may be illustrated for purely explanatory purposes (e.g., may or may not be displayed on the display 212). In some implementations, each of the first selection region 230 and the second selection region 232 is positioned at least partially within (e.g., inside of) the first UI element 222, as illustrated in FIG. 2B.

While displaying the application launcher 220, the electronic device 210 receives eye tracking data from the eye tracker. In some implementations, the eye tracking data indicates eye tracking information regarding one or more eyes of the user 50, such as an eye position (e.g., iris position) or eye movement (e.g., saccade or smooth pursuit). In some implementations, based on the eye tracking data, the electronic device 210 determines that a first gaze position is directed to within the first selection region 230. For example, as illustrated in FIG. 2C, the first gaze position is indicated by a first gaze position indicator 234, which is illustrated for purely explanatory purposes.

Based on the eye tracking data, the electronic device 210 determines that a first targeting criterion is satisfied with respect to the first selection region 230. For example, determining that the first targeting criterion is satisfied may include determining that the first gaze position is directed to within the first selection region 230 for at least a threshold amount of time. As another example, determining that the first targeting criterion is satisfied may include, after initially determining the first gaze position, determining that the gaze of the user 50 drifts less than a threshold amount. Accordingly, the electronic device 210 determines that the first targeting criterion is satisfied with respect to the first selection region 230. In other words, the user 50 has targeted the first selection region 230.

In some implementations, based on determining that the first targeting criterion is satisfied, the electronic device 210 displays, on the display 212, a gaze indicator. The gaze indicator provides feedback to the user 50 that the first targeting criterion is satisfied, and thus that the user 50 need not continue to gaze at the first selection region 230. For example, as illustrated in FIG. 2D, the gaze indicator corresponds to a first overlay 236 that is displayed at a position within the first selection region 230. In some implementations, as illustrated in FIGS. 2E and 2F, the electronic device 210 continues to display the first overlay 236 until the electronic device 210 determines that a second targeting criterion is satisfied or a disengagement criterion is satisfied. For example, the disengagement criterion is satisfied by canceling selection of first UI element 222, based on gazing away from the first UI element 222 or the first selection region 230, or by gazing at a different UI element or its associated selection region.

In some implementations, based on the eye tracking data, the electronic device 210 determines that a second targeting criterion is satisfied with respect to the second selection region 232. For example, determining that the second targeting criterion is satisfied may include determining that a second gaze position is directed to within the second selection region 232 after determining that the first gaze position is directed to within the first selection region 230. In some implementations, as illustrated in FIG. 2E, the second gaze position is indicated by a second gaze position indicator 238, which is illustrated for purely explanatory purposes. In some implementations, the electronic device 210 determines that the second gaze position is directed to within the second selection region 232 for at least the threshold amount of time, and accordingly determines that a second targeting criterion is satisfied with respect to the second selection region 232. As another example, determining that the second targeting criterion is satisfied may include, after initially determining the second gaze position, determining that the gaze of the user 50 drifts less than a threshold amount. Accordingly, the electronic device 210 determines that the second targeting criterion is satisfied with respect to the second selection region 232. In other words, the user 50 has targeted the second selection region 232.

Based at least in part on determining the satisfaction of both the first targeting criterion and the second targeting criterion, the electronic device 210 selects the first UI element 222. In some implementations, based on selecting the first UI element 222, the electronic device 210 displays a selection indicator on the display 212, and ceases to display the gaze indicator. The selection indicator provides feedback to the user 50 that the first UI element 222 has been selected, and thus the user 50 need not continue to gaze at the first UI element 222. For example, as illustrated in FIG. 2F, the selection indicator corresponds to a second overlay 240 that approximates the area of the first UI element 222. One of ordinary skill in the art will appreciate that the appearance of the selection indicator may vary across different implementations.

In some implementations, based on selecting a particular UI element, the electronic device 210 performs a corresponding operation or function. For example, as illustrated in FIG. 2G, based on selecting the first UI element 222 (associated with the music application), the electronic device 210 launches an associated music application UI 242. In some implementations, upon performing the corresponding operation or function, the electronic device 210 ceases to display the second overlay 240 (e.g., the selection indicator), as illustrated in FIGS. 2F and 2G.

In some implementations, in addition to the first targeting criterion and the second targeting criterion, the electronic device 210 selects a particular UI element based on a scanning criterion. For example, FIGS. 2H-2N illustrate an example of selecting the first UI element 222 further based on satisfaction of the scanning criterion.

As illustrated in FIG. 2H, in some implementations, the first UI element 222 is further associated with a scanning region 244 positioned in the first UI element 222 (e.g., within the boundary of the first UI element 222). The scanning region 244 connects the first selection region 230 with the second selection region 232. The scanning region 244 is illustrated for purely explanatory purposes. In some implementations, determining that the scanning criterion is satisfied includes determining, based on the eye tracking data, a gaze movement within the scanning region 244 from the first selection region 230 to the second selection region 232. Moreover, in some implementations, determining that the scanning criterion is satisfied includes determining that the gaze movement does not move outside of the scanning region. One of ordinary skill in the art will appreciate that, in some implementations, the scanning region 244 has a different shape or size.

As illustrated in FIGS. 2I and 2J, based on the eye tracking data, the electronic device 210 determines that a third gaze position (indicated by a third gaze position indicator 246) directed to within the first selection region 230 satisfies the first trigger criterion. For example, the electronic device 210 determines that the third gaze position is directed to within the first selection region 230 for at least a threshold amount of time. Accordingly, as illustrated in FIG. 2J, the electronic device 210 may display a gaze indicator 248 to indicate satisfaction of the first trigger criterion.

As illustrated in FIGS. 2K-2M, the electronic device 210 determines, based on the eye tracking data, a gaze movement from the first selection region 230 to the second selection region 232. The gaze movement is indicated by a gaze movement indicator 250, which is illustrated for purely explanatory purposes. Notably, the gaze movement stays within the scanning region 244.

As illustrated in FIG. 2L, the gaze movement proceeds, within the scanning region 244, from the third gaze position to a fourth gaze position (indicated by a fourth gaze position indicator 252).

As illustrated in FIG. 2M, the gaze movement terminates at a fifth gaze position (indicated by a fifth gaze position indicator 253), which is within the second selection region 232. Accordingly, because the gaze movement moved from the first selection region 230 to the second selection region 232, and because the gaze movement stayed within the scanning region 244, the electronic device 210 determines satisfaction of the scanning criterion.

In some implementations, the electronic device 210 displays, on the display 212, an indicator of the gaze movement. For example, the electronic device 210 displays a moving reticle that tracks a gaze movement across a UI element.

Moreover, the electronic device 210 determines, based on the eye tracking data, that the fifth gaze position directed to within the second selection region 232 satisfies the second trigger criterion. For example, the electronic device 210 determines that the fifth gaze position is directed to within the second selection region 232 for at least the threshold amount of time. Accordingly, in some implementations, based on determining the satisfaction of the first trigger criterion and the second trigger criterion, and based on determining the satisfaction of the scanning criterion, the electronic device 210 selects the first UI element 222. In some implementations, as illustrated in FIG. 2N, the electronic device 210 displays, on the display 212, a selection indicator (e.g., overlay) 254 to indicate the selection.

In some implementations, the electronic device 210 displays multiple UI elements that are proximate to each other, such as the first UI element 222 and the second UI element 226. In some implementations, the first UI element 222 is associated with a selection region that overlaps a selection region associated with the second UI element 226. For example, as illustrated in FIG. 2O, the second UI element 226 is associated with a third selection region 256 and a fourth selection region 258. Continuing with this example, the third selection region 256 partially overlaps with the first selection region 230 in a first overlapping region 260, and the fourth selection region 258 partially overlaps with the second selection region 232 in a second overlapping region 262. The overlapping regions may increase the likelihood that, although the user 50 intends to select the first UI element 222, the user 50 unintentionally selects the second UI element 226 (e.g., based on noisy eye tracking data). Moreover, even where a selection region of the first UI element 222 does not overlap with a selection region of the second UI element 226, a close proximity of the first UI element 222 to the second UI element 226 increases the likelihood of an unintentional selection.

Accordingly, in order to reduce the likelihood of an unintentional selection, various implementations disclosed herein include reducing respective size(s) of one or more selection regions, in order to reduce a size of a corresponding overlapping region. As illustrated in FIG. 2P, based on the eye tracking data, the electronic device 210 determines that a sixth gaze position (indicated by a sixth gaze position indicator 264) satisfies a first trigger criterion with respect to the first selection region 230. In some implementations, based on determining that the sixth gaze position satisfies the first trigger criterion, the electronic device 210 reduces the size of the third selection region 256. For example, as illustrated in FIGS. 2P and 2Q, the third selection region 256 is shrunk to a reduced third selection region 266. In some implementations, the electronic device 210 reduces the size of a particular selection region to reduce a size of corresponding overlapping region or to increase a distance between selection regions (e.g., increase distance between respective borders of selection regions of two proximate UI elements). For example, as illustrated in FIGS. 2P and 2Q, the electronic device 210 reduces the size of the third selection region 256 such that the reduced third selection region 266 does not overlap with the first selection region 230. Accordingly, the first overlapping region 260 is effectively eliminated. In some implementations, the size of an overlapping region is reduced, but not eliminated.

Moreover, in some implementations, based on determining that the sixth gaze position satisfies the first trigger criterion, the electronic device 210 also reduces the size of the fourth selection region 258 to a reduced fourth selection region 268, as illustrated in FIGS. 2P and 2Q. Accordingly, the electronic device 210 may also reduce the size of the second overlapping region 262. In some implementations, the electronic device 210 may also reduce the size of all selection regions associated with UI element(s) other than the currently targeted UI element (e.g., the first UI element 222).

As illustrated in FIG. 2R, the electronic device 210 determines, based on the eye tracking data, a gaze movement from the first selection region 230 to the second selection region 232. The gaze movement is indicated by a gaze movement indicator 270, which is illustrated for purely explanatory purposes.

In some implementations, while detecting the gaze movement, the electronic device 210 maintains the reduced third selection region 266 and/or the reduced fourth selection region 268 until selecting the first UI element 222, as illustrated in FIGS. 2R-2U. Namely, as part of the gaze movement, the electronic device 210 determines a seventh gaze position (indicated by a seventh gaze position indicator 272), and maintains the reduced third selection region 266 and the reduced fourth selection region 268, as illustrated in FIG. 2S. Moreover, as part of the gaze movement, the electronic device 210 determines an eighth gaze position (indicated by an eighth gaze position indicator 274) directed to within the second selection region 232, and maintains the reduced third selection region 266 and the reduced fourth selection region 268, as illustrated in FIG. 2T.

Moreover, the electronic device 210 determines that the eighth gaze position satisfies the second targeting criterion with respect to the second selection region 232 (e.g., the gaze of the user 50 is maintained within the second selection region 232 for a threshold amount of time). In some implementations, while determining whether or not the second targeting criterion is satisfied, the electronic device 210 maintains the reduced third selection region 266 and the reduced fourth selection region 268.

Based on determining the second targeting criterion is satisfied, the electronic device 210 selects the first UI element 222. For example, in some implementations, the electronic device 210 displays an overlay 276 within the first UI element 222, in order to indicate the selection of the first UI element 222, as illustrated in FIG. 2U. Moreover, in some implementations, based on selecting the first UI element 222, the electronic device 210 restores the third selection region 256 and the fourth selection region 258. Namely, as illustrated in FIGS. 2T and 2U, the electronic device 210 enlarges the reduced third selection region 266 to the third selection region 256, and enlarges the reduced fourth selection region 268 to the fourth selection region 258.

In some implementations, the electronic device 210 may additionally or alternatively deactivate (e.g., make un-targetable) one or more selection regions associated with a UI element other than a currently targeted UI element. For example, with reference to FIG. 2P, in response to determining that the first targeting criterion is satisfied with respect to the first selection region 230 of the first UI element 222, the electronic device 210 deactivates the third selection region 256 and/or the fourth selection region 258. Moreover, in some implementations, the electronic device 210 maintains the deactivation until receiving a deactivation input from the user 50, such as when the user 50 looks away from the first UI element 222 (e.g., for a threshold amount of time), or when user 50 provides an explicit cancellation input. In some implementations, the electronic device 210 also reduces the size of a selection region(s) of a non-targeted UI element.

Figure 3A:
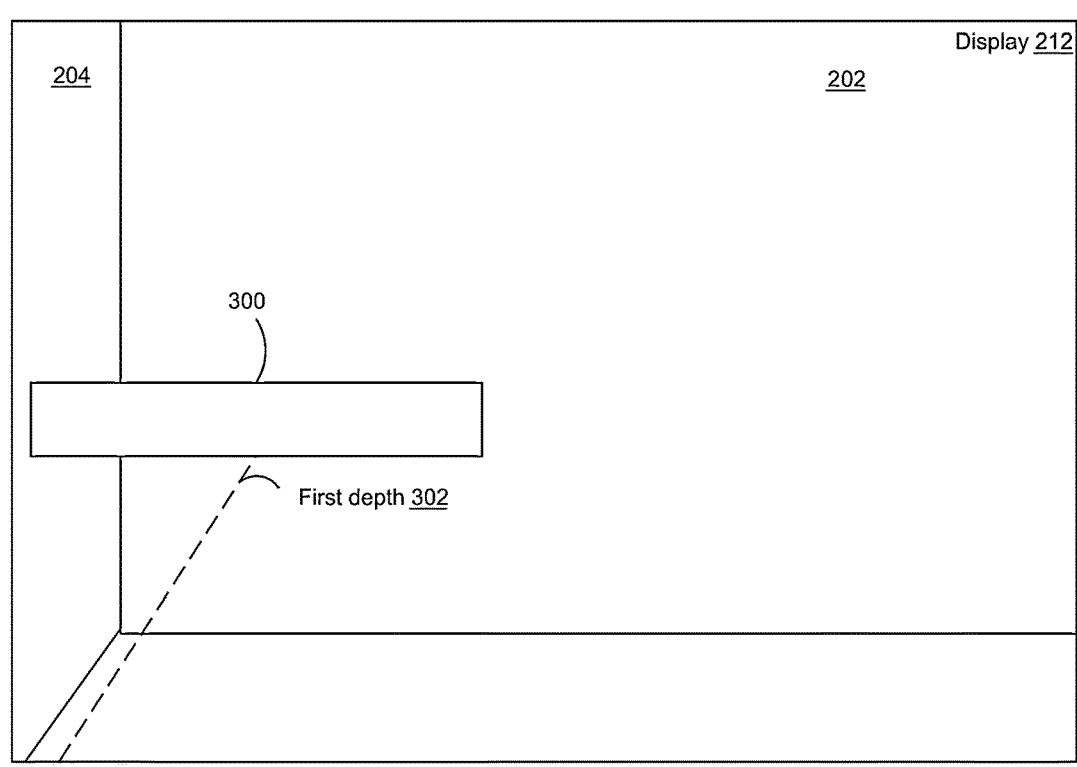
FIGS. 3A-3C are an example of targeting based on depth in accordance with some implementations.
Figure 3B:
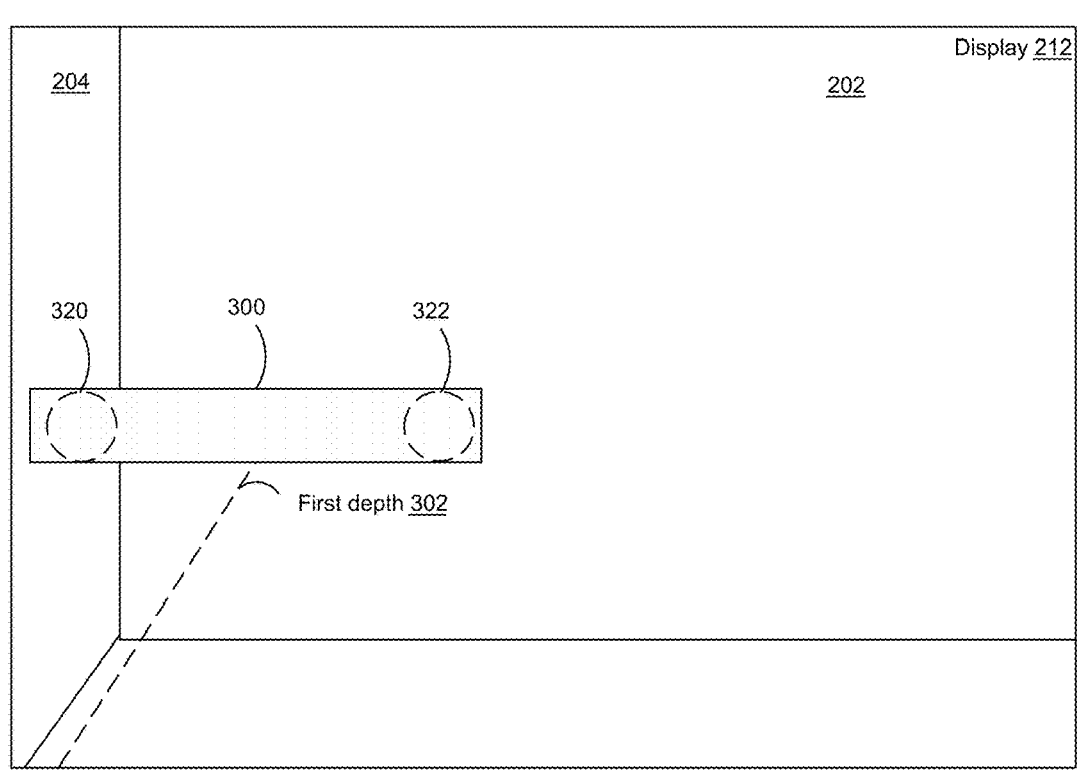
Figure 3C:
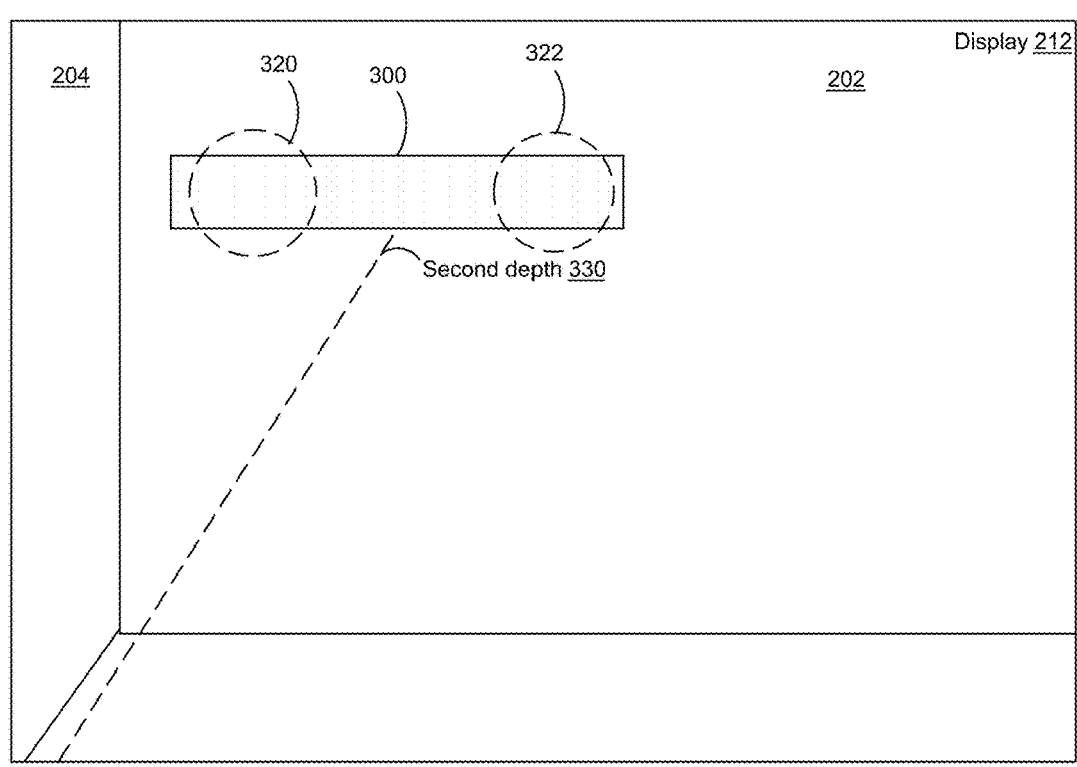

FIGS. 3A-3C are an example of targeting based on depth in accordance with some implementations.

As illustrated in FIG. 3A, the electronic device 210 displays, on the display 212, a third UI element 300. The third UI element 300 is associated with a first depth 302 corresponding to a distance between the electronic device 210 and the third UI element 300. The third UI element 300 is associated with a first selection region 320 and a second selection region 322, which may be separately targeted. Examples of targeting are described with reference to FIGS. 2A-2U.

In various circumstances, a depth of a UI element affects the efficiency or accuracy in determining selection of the UI element via an eye gaze of a user. A larger depth may be associated with less accurate targeting of an intended UI element. For example, the targeting is based on eye tracking data from an eye tracker, wherein the eye tracking data is associated with a given (e.g., assumed) level of eye tracking error (e.g., gaze angle error). One example of the gaze angle error is a lateral offset between a computed gaze vector (indicated in the eye tracking data) and an actual gaze vector (e.g., where the user is actually gazing). As the depth increases, the given level of eye tracking error is effectively magnified, and thus the eye tracking data becomes less reliable for usage in the targeting determination. Accordingly, an increased depth may be associated with an increased likelihood of an unintentional selection.

Accordingly, in some implementations, the electronic device 210 determines a dimensional characteristic (e.g., a size) of a selection region based on a depth, and varies the dimensional characteristic based on a change of the depth. For example, as illustrated in FIG. 3B, based on determining that the first depth 302 is relatively small, the electronic device 210 determines a correspondingly small dimensional first characteristic for the first selection region 320 and for the second selection region 322. Moreover, in some implementations, based on determining an increase of the depth, the electronic device 210 correspondingly increases the dimensional characteristic. For example, as illustrated in FIG. 3C, based on detecting an increase from the first depth 302 to a second depth 330, the electronic device 210 may increase the dimensional characteristic (e.g., area) associated with first selection region 320 and the second selection region 322 to a larger, second dimensional characteristic. As a counterexample, based on detecting a decrease of the depth, the electronic device 210 may decrease the dimensional characteristic (e.g., area) associated with first selection region 320 and the second selection region 322.

Accordingly, in some implementations, in addition to or instead of varying a dimensional characteristic based on a change of depth, the electronic device 210 targets based on a gaze cone and depth. To that end, in some implementations, the electronic device 210 determines a gaze vector via an eye tracker, and positions the gaze cone based on the gaze vector. For example, the gaze cone is positioned such that the gaze vector runs through the center line of the gaze cone. In some implementations, the electronic device 210 positions the vertex of the gaze cone at the eye of a user. Moreover, in some implementations, the electronic device 210 enables targeting of any selection region with which the gaze cone intersects. As the depth of a UI element increases, the corresponding radius of the gaze cone also increases, providing coverage for targeting the UI element. Moreover, in some implementations, the angle of the gaze cone is based on the reliability (e.g., confidence score) associated with the eye tracking data. For example, for less reliable (e.g., noisier) eye tracking data, the angle of the gaze cone is relatively larger, whereas the angle of the gaze is cone is relatively small for more reliable eye tracking data.

Figure 4:
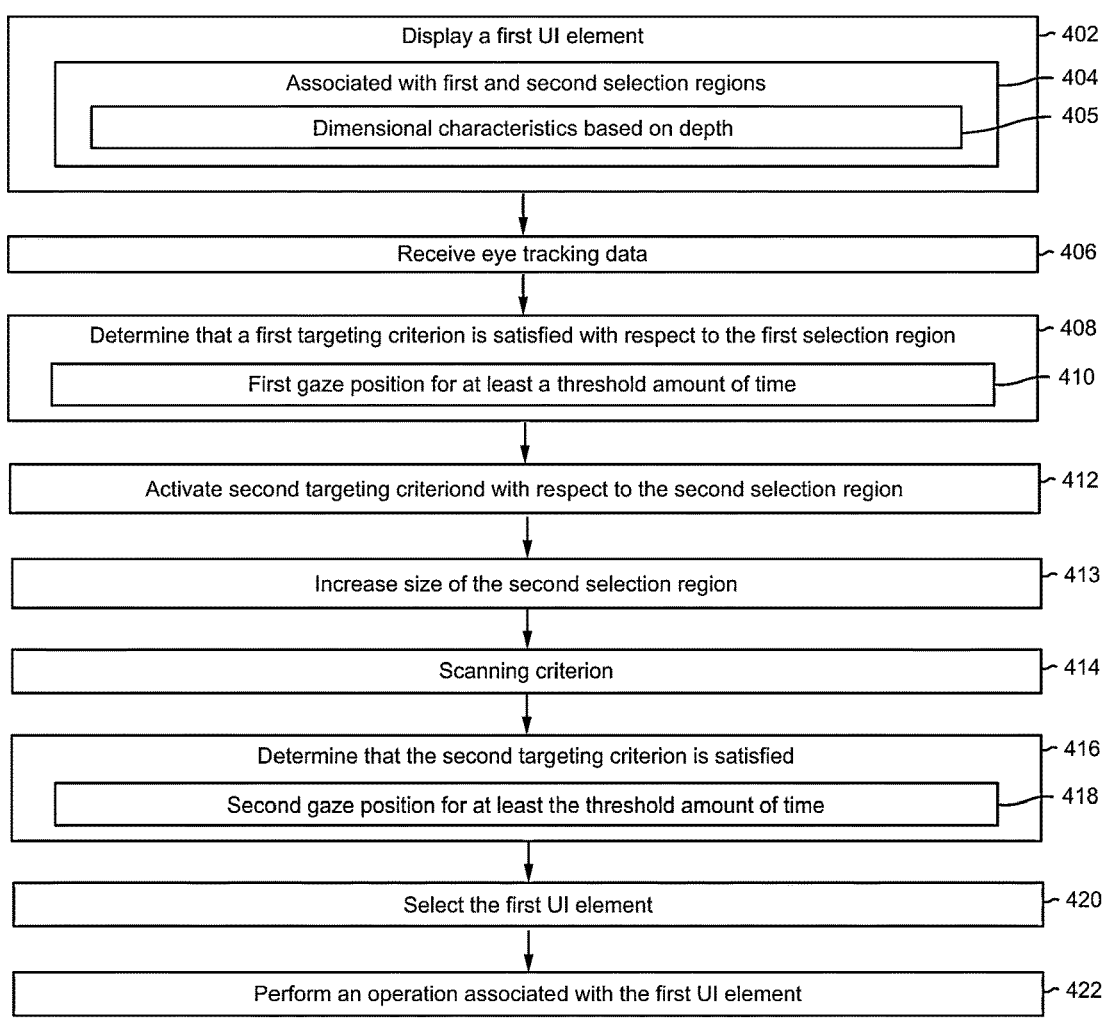
FIG. 4 is a first example of a flow diagram of a method of selecting a UI element based on eye tracking in accordance with some implementations.

FIG. 4 is a first example of a flow diagram of a method 400 of selecting a UI element based on eye tracking in accordance with some implementations. In various implementations, the method 400 or portions thereof are performed by an electronic device including an eye tracker and a display (e.g., the electronic device 100 in FIG. 1, or the electronic device 210 in FIGS. 2A-2U or FIGS. 3A-3C). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying, on a display, a first UI element. The first UI element can be any shape or size, and can be 2D or 3D. As represented by block 404, the first UI element is associated with first and second selection regions. For example, with reference to FIG. 2B, the electronic device 210 displays, on the display 212, the first UI element 222, which is associated with the first selection region 230 and the second selection region 232. In some implementations, the first selection region does not overlap with the second selection region. In some implementations, a particular selection region is positioned at least partially within the first UI element. In some implementations, a selection region is less than a threshold distance from an edge of the first UI element. For example, the first selection region is less than the threshold distance from the left edge of the first UI element, and the second selection region is less than the threshold distance from the right edge of the first UI element. In some implementations, the first selection region is substantially horizontal with respect to the second selection region on the display. In some implementations, each of the first selection region and the second selection region is positioned at least partially within the first UI element, and the first selection region is more than a threshold distance away from the second selection region.

In some implementations, as represented by block 405, each of the first selection region and the second selection region is associated with a dimensional characteristic. The dimensional characteristic may correspond to area, volume, etc. The dimensional characteristic may be selected based on a corresponding depth—e.g., an apparent distance between the electronic device and the first UI element. For example, with reference to FIG. 3B, the electronic device 210 determines a relatively small first dimensional characteristic for the first selection region 320 and the second selection region 322, based on the first depth 302. As another example, with reference to FIG. 3C, the electronic device 210 determines a relatively large second dimensional characteristic for the first selection region 320 and the second selection region 322, based on the second depth 330, which is larger than the first depth 302. In some implementations, the method 400 includes utilizing a conical function to determine a dimensional characteristic, wherein an input to the conical function is the current depth of the first UI element.

As represented by block 406, while displaying the first UI element, the method 400 includes receiving eye tracking data using an eye tracker. In some implementations, the eye tracking data indicates gaze information regarding one or more eyes of a user. For example, at a first time the eye tracking data indicates first eye position information, at a second time the eye tracking data indicates second eye position information, etc.

As represented by block 408, while displaying the first UI element, the method 400 includes determining, based on the eye tracking data, that a first targeting criterion is satisfied with respect to the first selection region. For example, as represented by block 410, determining the satisfaction of the first targeting criterion includes determining that a first gaze position is directed to within the first selection region for at least a threshold amount of time. As another example, determining the satisfaction of the first targeting criterion includes, after determining that the first gaze position is directed to within the first selection region, detecting less than a threshold amount of gaze drift. In some implementations, determining the first targeting criterion is satisfied includes assessing a gaze cone. To that end, in some implementations, the method 400 includes determining a gaze vector based on the eye tracking data, and positioning the vertex of the gaze cone at the eye of a user, with the angle of the gaze cone being a function of the gaze vector. For example, the gaze cone is positioned such that the gaze vector runs through the center line of the gaze cone. Moreover, the method 400 includes determining the first targeting criterion is satisfied based on determining the cone intersects with the first selection region (e.g., for at least a threshold amount of time).

In some implementations, in response to determining that the first targeting criterion is satisfied, the method 400 includes displaying a gaze indicator. For example, with reference to FIGS. 2C and 2D, based on determining that the first gaze position is directed to within the first selection region 230 for at least the threshold amount of time, the electronic device 210 displays, on the display 212, the first overlay 236. Moreover, in some implementations and with reference to FIGS. 2E and 2F, the electronic device 210 maintains display of the first overlay 236 until determining that a second targeting criterion with respect to the second selection region 232 is satisfied or determining that selection has been cancelled (e.g., user looks away from the first UI element).

As represented by block 412, in some implementations, in response to determining the satisfaction of the first targeting criterion, the method 400 includes activating the second targeting criterion. Accordingly, before determining the satisfaction of the first targeting criterion, the second targeting criterion is de-activated such that an eye gaze directed to within the second selection region (e.g., for more than a threshold amount of time) does not result in selection of the first UI element. Accordingly, false positive selections of the first UI element may be avoided.

As represented by block 413, in some implementations, in response to determining the satisfaction of the first targeting criterion, the method 400 includes increasing a size of the second selection region. Increasing the size of the second selection region may increase the likelihood that an eye gaze successfully satisfies the second targeting criterion with respect to the second selection region. In some implementations, the method 400 includes restoring the size of the second selection region upon determining that the second targeting criterion is not satisfied within a threshold amount of time from determining that the first targeting criterion is satisfied.

As represented by block 414, in some implementations, the method 400 includes determining, based on the eye tracking data, that a gaze movement between the first selection region and the second selection region satisfies a scanning criterion.

In some implementations, the scanning criterion is based on a scanning region positioned within the first UI element. The scanning region connects the first selection region with the second selection region. In some implementations, the scanning region is rectangular or substantially rectangular (e.g., a rectangle with rounded edges). Moreover, the method 400 includes determining that the scanning criterion is satisfied based on determining a gaze movement within the scanning region from the first selection region to the second selection region. For example, with reference to FIGS. 2K-2M, the electronic device 210 determines, based on the eye tracking data, that the gaze movement from the first selection region 230 to the second selection region 232 is within the scanning region 244 (e.g., the gaze movement does not move outside of the scanning region 244). Accordingly, the electronic device 210 determines that the scanning criterion is satisfied.

In some implementations, determining the scanning criterion is satisfied is based on a velocity of the gaze movement. To that end, in some implementations, determining the scanning criterion is satisfied includes determining that a duration associated with the gaze movement is less than a maximum duration threshold (e.g., scan is not too fast).

Further to that end, in some implementations, determining the scanning criterion is satisfied includes also determining that the duration is greater than a minimum duration threshold (e.g., scan is not too slow).

In some implementations, determining that the scanning criterion is satisfied includes determining that the gaze movement between the first selection region and the second selection region is substantially horizontal. For example, the gaze movement is left-to-right or right-to-left, with a nominal amount of up/down movement.

As represented by block 416, while displaying the first UI element, the method 400 includes determining, based on the eye tracking data, that the second targeting criterion is satisfied with respect to the first selection region. For example, as represented by block 418, determining the satisfaction of the second targeting criterion includes determining that a second gaze position is directed to within the second selection region for at least the threshold amount of time. As another example, determining the satisfaction of the second targeting criterion includes, after determining that the second gaze position is directed to within the second selection region, detecting less than a threshold amount of gaze drift.

In some implementations, determining the second targeting criterion is satisfied includes assessing a gaze cone, as described above with reference to determining the first targeting criterion is satisfied based on assessing the gaze cone.

As represented by block 420, while displaying the first UI element, the method 400 includes selecting the first UI element based at least in part on determining that the first targeting criterion is satisfied and that the second targeting criterion is satisfied. In some implementations, selecting the first UI element is further based on determining that the gaze movement satisfies the scanning criterion, as described with reference to block 414. In some implementations, the method 400 includes displaying, on the display, a selection indicator in response to selecting the first UI element. For example, as illustrated in FIG. 2F, the electronic device 210 displays, on the display 212, the second overlay 240 to indicate the selection of the first UI element 222. As another example, as illustrated in FIG. 2N, based on determining satisfaction of the first targeting criterion and the second targeting criterion, and further based on determining satisfaction of the scanning criterion, the electronic device 210 displays, on the display 212, the selection indicator 254 to indicate the selection of the first UI element 222.

As represented by block 422, in some implementations, in response to selecting the first UI element, the method 400 includes performing a corresponding operation or function. For example, with reference to FIG. 2G, based on selecting the first UI element 222 (associated with the music application), the electronic device 210 launches an associated music application UI 242. In some implementations, upon performing the corresponding operation or function, the electronic device 210 ceases to display the second overlay 240 (e.g., the selection indicator), as illustrated in FIGS. 2F and 2G.

Figure 5:
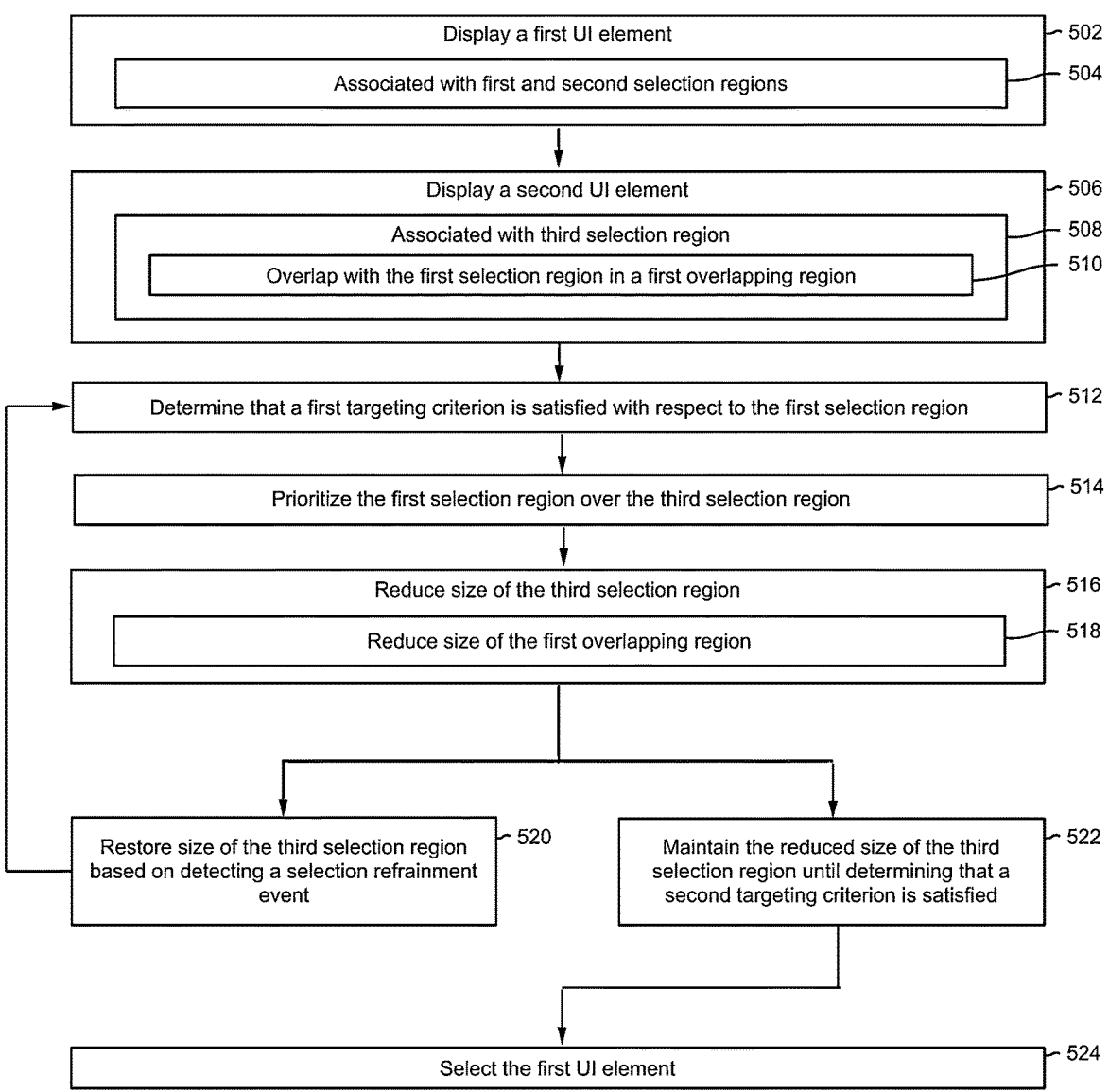
FIG. 5 is a second example of a flow diagram of a method of selecting a UI element based on eye tracking in accordance with some implementations.

FIG. 5 is a second example of a flow diagram of a method 500 of selecting a UI element based on eye tracking in accordance with some implementations. In various implementations, the method 500 or portions thereof are performed by an electronic device (e.g., the electronic device 100 in FIG. 1, or the electronic device 210 in FIGS. 2A-2U or FIGS. 3A-3C). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes displaying, on a display, a first UI element. As represented by block 504, the first UI element is associated with first and second selection regions. For example, with reference to FIG. 2P, the electronic device 210 displays, on the display 212, the first UI element 222, which is associated with the first selection region 230 and the second selection region 232.

As represented by block 506, the method 500 includes (e.g., concurrently) displaying, on the display, a second UI element. As represented by block 508, the second UI element is associated with a third selection region. Continuing with the previous example and with reference to FIG. 2P, the electronic device 210 displays, on the display 212, the second UI element 226, which is associated with the third selection region 256. As represented by block 510, in some implementations, the third selection region partially overlaps with the first selection region in a first overlapping region. Continuing with the previous example and with reference to FIG. 2P, the third selection region 256 partially overlaps with the first selection region 230 in the first overlapping region 260.

As represented by block 512, the method 500 includes, while displaying the first and second UI elements, determining, based on eye tracking data from an eye tracker, that a first targeting criterion is satisfied with respect to the first selection region. Examples of determining that the first targeting criterion is satisfied are described with reference to blocks 408 and 410 of FIG. 4.

As represented by block 514, in some implementations, in response to determining that the first targeting criterion is satisfied, the method 500 includes prioritizing the first selection region over the third selection region. For example, the prioritizing includes continuing to determine the satisfaction of the first targeting criterion despite determining, based on the eye tracking data, that the gaze position is directed to within the first overlapping region (e.g., for more than a threshold amount of time). In some implementations, the prioritizing includes, in response to determining, based on the eye tracking data, that a gaze position is directed to the third selection region for more than a first threshold amount of time but less than a second threshold amount of time, continuing to determine that the first targeting criterion is satisfied. Moreover, in some implementations, in response to determining that the gaze position is directed to the third selection region for more than the second threshold amount of time, determining that the first targeting criterion ceases to be satisfied (and optionally determining that a third targeting criterion with respect to the third selection region is satisfied).

As represented by block 516, in some implementations, in response to determining that the first targeting criterion is satisfied, the method 500 includes reducing the size of the third selection region. For example, with reference to FIGS. 2P and 2Q, the electronic device 210 shrinks the third selection region 256 to the reduced third selection region 266. As represented by block 518, in some implementations, reducing the size of the third selection region reduces a size of the first overlapping region, as illustrated by the reduction of the first overlapping region 260 between FIGS. 2P and 2Q. Reducing the size of selection regions(s) of an adjacently positioned UI element simplifies eye tracking—e.g., decouples a single 2D tracking problem into several independent 1D tracking operations.

In some implementations, in response to determining that the first targeting criterion is satisfied, the method 500 includes reducing the size of all selection regions of all UI elements other than the currently targeted first UI element. In some implementations, in response to determining that the first targeting criterion is satisfied, the method 500 includes reducing respective sizes of first selection regions of the other UI elements (e.g., near the left edges of the other UI elements), while maintaining the sizes of the second selection regions of the other UI elements (e.g., near the right edges of the other UI elements).

In some implementations, in response to determining that the first targeting criterion is satisfied, the method 500 includes deactivating selection regions of the other UI elements. For example, with reference to FIG. 2P, based on determining that the first targeting criterion is satisfied with respect to the first selection region 230, the method 500 includes deactivating the third selection region 256 and/or deactivating the fourth selection region 258. In some implementations, in response to determining that the first targeting criterion is satisfied, the method 500 includes reducing respective sizes of first selection regions of the other UI elements (e.g., near the left edges of the other UI elements), and deactivating the respective second selection regions of the other UI elements (e.g., near the right edges of the other UI elements).

As represented by block 520, in some implementations, the method 500 includes, after reducing the size of the third selection region, detecting a selection refrainment event with respect to the first UI element. For example, detecting the selection refrainment event includes determining that the second targeting criterion is not satisfied within a threshold amount of time from determining that the first targeting criterion is satisfied. As another example, detecting the selection refrainment event includes determining, based on the eye tracking data, that a gaze position is directed to a UI element different from the first UI element, such as the second UI element. Moreover, in response to detecting the selection refrainment event, the method 500 may include restoring the size of the third selection region (e.g., increasing the third selection region to its initial size). Moreover, in some implementations, in response to detecting the selection refrainment event, the method 500 reverts back to block 512, in which the method 500 proceeds to determining whether or not the first targeting criterion is satisfied.

As represented by block 522, in some implementations, the method 500 includes maintaining the reduced size of the third selection region until determining that the second targeting criterion is satisfied. For example, with reference to FIGS. 2R-2U, the electronic device 210 maintains the reduced third selection region 266 until determining satisfaction of the second targeting criterion with respect to the second selection region 232, upon which the electronic device 210 restores the third selection region 256 in FIG. 2U.

As represented by block 524, while displaying the first and second UI elements, the method 500 includes selecting the first UI element based on determining that the first targeting criterion is satisfied and that the second targeting criterion is satisfied.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors, a non-transitory memory, and a display:

displaying, on the display, a first user interface (UI) element having a first selection region and a second selection region; and after displaying the first UI element with the first selection region and the second selection region:

determining, based on eye tracking data, that a targeting criterion is satisfied with respect to the first selection region or the second selection region based on a gaze cone and a depth between the first UI element and the electronic device; and selecting the first UI element based at least in part on determining that the targeting criterion is satisfied.

2. The method of claim 1, wherein determining that the targeting criterion is satisfied includes:

determining that a first gaze position is directed to within the first selection region for at least a threshold amount of time, or determining that a second gaze position is directed to within the second selection region for at least the threshold amount of time.

3. The method of claim 1, further comprising at least one of:

displaying, on the display, a gaze indicator in response to determining that the targeting criterion is satisfied; and displaying, on the display, a selection indicator in response to selecting the first UI element.

4. The method of claim 1, wherein selecting the first UI element is further based on determining, based on the eye tracking data, that a gaze movement from the first selection region to the second selection region satisfies a scanning criterion.

5. The method of claim 4, wherein the first UI element is further associated with a scanning region positioned within the first UI element, wherein the scanning region connects the first selection region with the second selection region, and wherein determining that the scanning criterion is satisfied includes determining that the gaze movement is within the scanning region.

6. The method of claim 5, wherein determining that the scanning criterion is satisfied includes determining that the gaze movement does not move outside of the scanning region.

7. The method of claim 1, further comprising, in response to determining that the targeting criterion is satisfied with respect to the first selection region, increasing a size of the second selection region.

8. The method of claim 1, further comprising:

displaying a second UI element on the display, wherein the second UI element is associated with a third selection region; and while displaying the first and second UI elements, in response to determining that the targeting criterion is satisfied, reducing a size of the third selection region.

9. The method of claim 8, wherein the third selection region partially overlaps with the first selection region in a first overlapping region, and wherein reducing the size of the third selection region reduces a size of the first overlapping region.

10. The method of claim 8, further comprising:

after reducing the size of the third selection region, detecting a selection refrainment event with respect to the first UI element; and in response to detecting the selection refrainment event, restoring the size of the third selection region.

11. The method of claim 8, further comprising, in response to determining that the targeting criterion is satisfied, prioritizing the first selection region over the third selection region.

12. The method of claim 11, wherein the prioritizing includes, after determining that the targeting criterion is satisfied:

in response to determining, based on the eye tracking data, that a gaze position is directed to the third selection region for more than a first threshold amount of time but less than a second threshold amount of time, continuing to determine that the targeting criterion is satisfied; and in response to determining that the gaze position is directed to the third selection region for more than the second threshold amount of time, determining that the targeting criterion ceases to be satisfied.

13. A non-transitory computer readable storage medium storing one or more programs, the one or more programs comprising instructions, which, when executed by an electronic device with one or more processors, and a display, cause the electronic device to:

display, on the display, a first user interface (UI) element having a first selection region and a second selection region; and after displaying the first UI element with the first selection region and the second selection region:

determine, based on eye tracking data, that a targeting criterion is satisfied with respect to the first selection region or the second selection region based on a gaze cone and a depth between the first UI element and the electronic device; and select the first UI element based at least in part on determining that the targeting criterion is satisfied.

14. The non-transitory computer readable storage medium of claim 13, wherein the one or more programs further include the instructions, which, when executed by the electronic device, further cause the electronic device to:

display a second UI element on the display, wherein the second UI element is associated with a third selection region; and while displaying the first and second UI elements, in response to determining that the targeting criterion is satisfied, deactivate the third selection region.

15. The non-transitory computer readable storage medium of claim 13, wherein the first selection region is associated with a first dimensional characteristic, and wherein the first dimensional characteristic is based on a depth between the first UI element and the electronic device.

16. The non-transitory computer readable storage medium of claim 13, wherein determining that the targeting criterion is satisfied includes:

determining a gaze vector based on the eye tracking data;

positioning the gaze cone based on the gaze vector; and determining that the gaze cone intersects with the first selection region.

17. The non-transitory computer readable storage medium of claim 16, wherein the gaze cone is positioned such that the gaze vector runs through the center of the gaze cone.

18. The non-transitory computer readable storage medium of claim 13, wherein the gaze cone radially increases as the depth increases.

19. An electronic device comprising:

one or more processors;

a non-transitory memory;

a display; and one or more programs, wherein the one or more programs are stored in the non-transitory memory and configured to be executed by the one or more processors, the one or more programs including instructions for:

displaying, on the display, a first user interface (UI) element having a first selection region and a second selection region; and after displaying the first UI element with the first selection region and the second selection region:

determining, based on eye tracking data, that a targeting criterion is satisfied with respect to the first selection region or the second selection region based on a gaze cone and a depth between the first UI element and the electronic device; and selecting the first UI element based at least in part on determining that the targeting criterion is satisfied.

20. The electronic device of claim 19, wherein the one or more programs further include the instructions for:

displaying a second UI element on the display, wherein the second UI element is associated with a third selection region; and while displaying the first and second UI elements, in response to determining that the targeting criterion is satisfied, deactivating the third selection region.

21. The electronic device of claim 19, wherein the first selection region is associated with a first dimensional characteristic, and wherein the first dimensional characteristic is based on a depth between the first UI element and the electronic device.

22. The electronic device of claim 19, wherein determining that the targeting criterion is satisfied includes:

determining a gaze vector based on the eye tracking data;

positioning the gaze cone based on the gaze vector; and determining that the gaze cone intersects with the first selection region.

23. The electronic device of claim 22, wherein the gaze cone is positioned such that the gaze vector runs through the center of the gaze cone.

24. The electronic device of claim 19, wherein the gaze cone radially increases as the depth increases.

* * * * *